United States Patent
Otaki et al.

(10) Patent No.: US 12,066,842 B2
(45) Date of Patent: Aug. 20, 2024

(54) VEHICLE REMOTE INSTRUCTION SYSTEM

(71) Applicant: TOYOTA JIDOSHA KABUSHIKI KAISHA, Toyota (JP)

(72) Inventors: Sho Otaki, Yokohama (JP); Takayuki Iwamoto, Sunto-gun Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/202,673

(22) Filed: May 26, 2023

(65) Prior Publication Data

US 2023/0297103 A1    Sep. 21, 2023

Related U.S. Application Data

(63) Continuation of application No. 18/202,667, filed on May 26, 2023, which is a continuation of application
(Continued)

(30) Foreign Application Priority Data

Sep. 6, 2019  (JP) ................. 2019-163066

(51) Int. Cl.
*G05D 1/242*     (2024.01)
*B60W 50/14*    (2020.01)
(Continued)

(52) U.S. Cl.
CPC ........... *G05D 1/2427* (2024.01); *B60W 50/14* (2013.01); *B60W 60/001* (2020.02);
(Continued)

(58) Field of Classification Search
CPC .............. G05D 1/0011; G05D 1/0038; G05D 1/2427; G05D 1/2247; G05D 2101/20;
(Continued)

(56) References Cited

U.S. PATENT DOCUMENTS

| | | | |
|---|---|---|---|
| 9,465,388 | B1 | 10/2016 | Fairfield et al. |
| 9,760,092 | B2 | 9/2017 | Ferguson et al. |

(Continued)

FOREIGN PATENT DOCUMENTS

| | | | |
|---|---|---|---|
| CA | 3067958 A1 | 12/2018 | |
| JP | H11-003500 A | 1/1999 | |

(Continued)

OTHER PUBLICATIONS

Translation of KR-20210022570-A, 26 pages (Year: 2021).*
(Continued)

*Primary Examiner* — Dale W Hilgendorf
(74) *Attorney, Agent, or Firm* — Dinsmore & Shohl LLP

(57) ABSTRACT

In a vehicle remote instruction system, a remote commander issues a remote instruction relating to travel of an autonomous driving vehicle based on sensor information from an external sensor that detects an external environment of the autonomous driving vehicle. The vehicle remote instruction system sets a range of information to be transmitted to the remote commander among the sensor information detected by the external sensor, as a limited information range, based on the external situation or an external situation obtained based on map information and a trajectory of the autonomous driving vehicle.

10 Claims, 18 Drawing Sheets

Related U.S. Application Data

No. 18/202,660, filed on May 26, 2023, which is a continuation of application No. 18/202,652, filed on May 26, 2023, which is a continuation of application No. 17/004,449, filed on Aug. 27, 2020, now Pat. No. 11,703,852.

(51) Int. Cl.

| | | |
|---|---|---|
| *B60W 60/00* | (2020.01) | |
| *G01C 21/00* | (2006.01) | |
| *G05D 1/00* | (2024.01) | |
| *G05D 1/224* | (2024.01) | |
| *G05D 101/20* | (2024.01) | |
| *G08G 1/01* | (2006.01) | |
| *G08G 1/0967* | (2006.01) | |

(52) U.S. Cl.
CPC ......... *G05D 1/0011* (2013.01); *G05D 1/0038* (2013.01); *G05D 1/2247* (2024.01); *G08G 1/096725* (2013.01); *B60W 2555/00* (2020.02); *G01C 21/3863* (2020.08); *G05D 2101/20* (2024.01); *G08G 1/01* (2013.01)

(58) Field of Classification Search
CPC ............... B60W 20/14; B60W 60/001; B60W 2555/00; G08G 1/096725; G08G 1/01; G01C 21/3863
See application file for complete search history.

(56) References Cited

U.S. PATENT DOCUMENTS

| | | | |
|---|---|---|---|
| 10,156,848 B1 | 12/2018 | Konrardy et al. | |
| 11,079,753 B1* | 8/2021 | Roy | G05D 1/0088 |
| 11,140,366 B2 | 10/2021 | Hwang | |
| 2009/0237269 A1 | 9/2009 | Okugi et al. | |
| 2013/0181823 A1 | 7/2013 | Stählin et al. | |
| 2016/0259334 A1 | 9/2016 | Hashimoto et al. | |
| 2016/0283804 A1* | 9/2016 | Furman | G01C 21/30 |
| 2016/0328975 A1 | 11/2016 | Tokita | |
| 2017/0132922 A1 | 5/2017 | Gupta et al. | |
| 2017/0255195 A1 | 9/2017 | Mabuchi | |
| 2018/0013211 A1 | 1/2018 | Ricci | |
| 2018/0025636 A1 | 1/2018 | Boykin et al. | |
| 2018/0251128 A1 | 9/2018 | Penilla et al. | |
| 2018/0267558 A1* | 9/2018 | Tiwari | G05D 1/0246 |
| 2018/0275653 A1 | 9/2018 | Endo et al. | |
| 2018/0304828 A1 | 10/2018 | Kitani et al. | |
| 2019/0286123 A1 | 9/2019 | Bando et al. | |
| 2019/0339692 A1 | 11/2019 | Sakai et al. | |
| 2019/0354111 A1* | 11/2019 | Cheng | G05D 1/0027 |
| 2019/0361436 A1* | 11/2019 | Ueda | G08G 1/09 |
| 2020/0018100 A1 | 1/2020 | Aoi et al. | |
| 2020/0019185 A1 | 1/2020 | Magzimof | |
| 2020/0041992 A1 | 2/2020 | Nagashima | |
| 2020/0068434 A1 | 2/2020 | Pedersen et al. | |
| 2020/0135030 A1 | 4/2020 | Krivokon et al. | |
| 2020/0348665 A1* | 11/2020 | Bhanushali | G05D 1/0022 |
| 2021/0072743 A1 | 3/2021 | Otaki et al. | |
| 2021/0109515 A1* | 4/2021 | Urano | G05D 1/0027 |
| 2021/0116907 A1 | 4/2021 | Altman | |
| 2021/0331692 A1 | 10/2021 | Park et al. | |
| 2022/0182498 A1* | 6/2022 | Singh | G08G 1/16 |
| 2023/0415764 A1 | 12/2023 | Cserna et al. | |

FOREIGN PATENT DOCUMENTS

| | | | | |
|---|---|---|---|---|
| JP | 2014-180986 A | 9/2014 | | |
| JP | 2016-060336 A | 4/2016 | | |
| JP | 2016-162229 A | 9/2016 | | |
| JP | 2007-334765 A | 12/2017 | | |
| JP | 2018-142265 A | 9/2018 | | |
| JP | 2018-160134 A | 10/2018 | | |
| JP | 2018-180771 A | 11/2018 | | |
| JP | 2018-538647 A | 12/2018 | | |
| JP | 2019-502183 A | 1/2019 | | |
| JP | 2019-040587 A | 3/2019 | | |
| JP | 2019-073190 A | 5/2019 | | |
| JP | 2020-514850 A | 5/2020 | | |
| JP | 2021-043523 A | 3/2021 | | |
| KR | 10-2019-0102145 A | 9/2019 | | |
| KR | 20210022570 A | * | 3/2021 | G01S 13/931 |
| WO | 2017/079219 A1 | 5/2017 | | |
| WO | 2018/116978 A1 | 6/2018 | | |
| WO | 2018/155159 A1 | 8/2018 | | |

OTHER PUBLICATIONS

U.S. Appl. No. 17/004,449, filed Aug. 27, 2020, Sho Otaki et al.
Notice of Allowance dated May 3, 2024 in U.S. Appl. No. 18/202,660, filed May 26, 2023.

* cited by examiner

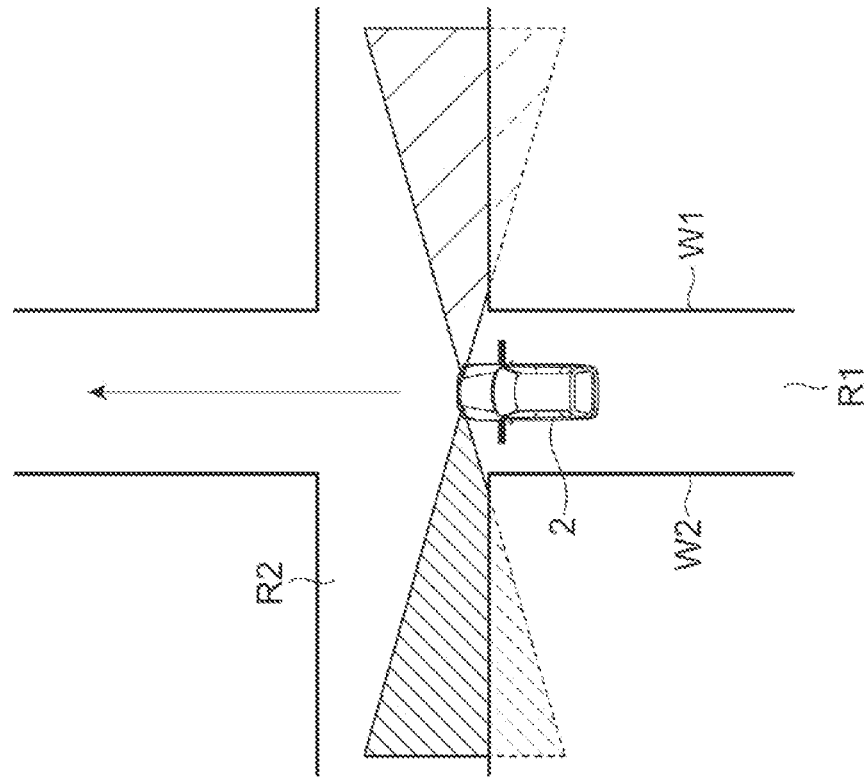
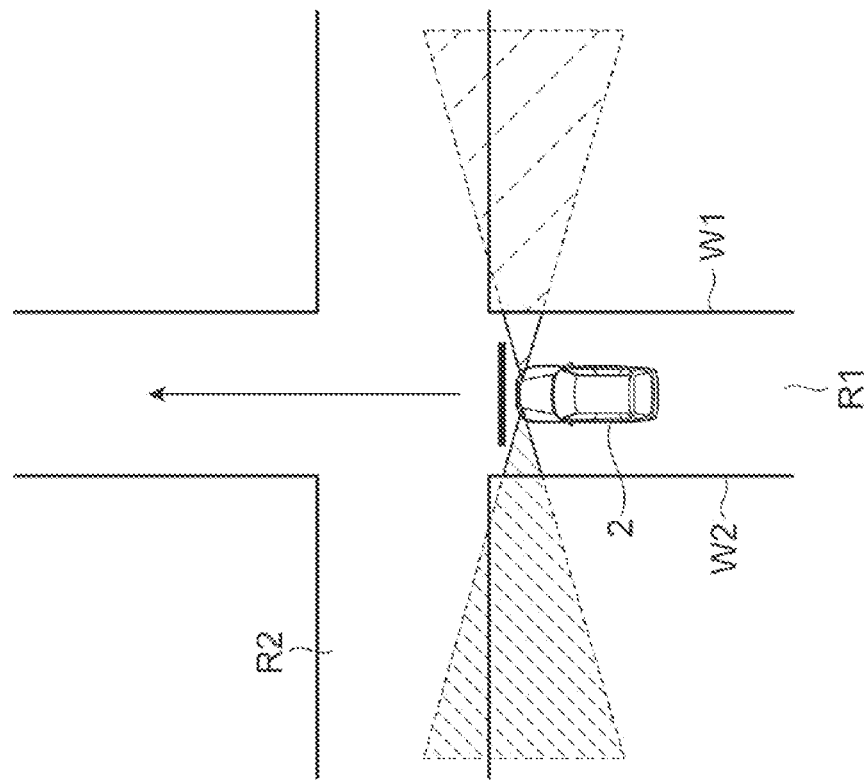

VEHICLE REMOTE INSTRUCTION SYSTEM

CROSS-REFERENCE TO RELATED APPLICATION

This application is a continuation application of U.S. patent application Ser. No. 17/004,449, now U.S. Pat. No. 11,703,852, which claims the benefit of priority from Japanese Patent Application No. 2019-163066, filed on Sep. 6, 2019, the entire contents of both of which are incorporated herein by reference.

TECHNICAL FIELD

The present disclosure relates to a vehicle remote instruction system in which a remote commander issues a remote instruction relating to travel of an autonomous driving vehicle.

BACKGROUND

For example, Japanese Unexamined Patent Application Publication No. 2018-180771 describes a vehicle remote instruction system that controls travel of an autonomous driving vehicle by issuing a remote instruction to the autonomous driving vehicle from a remote commander. In this vehicle remote instruction system, sensor information by the vehicle-mounted sensor is transmitted from the autonomous driving vehicle to the remote commander, and the remote commander issues the remote instruction based on the transmitted sensor information.

SUMMARY

Here, the sensor information needed when the remote commander issues the remote instruction differs depending on external situations (scenes) of the autonomous driving vehicle. When transmitting the sensor information without considering the external situation of the autonomous driving vehicle, unnecessary sensor information is also transmitted, and thus, the transmitted data capacity increases. For this reason, in this technical field, it is required to reduce the data capacity of the sensor information transmitted to the remote commander according to the external situation of the autonomous driving vehicle.

According to an aspect of the present disclosure, a vehicle remote instruction system is system in which a remote commander issues a remote instruction relating to travel of an autonomous driving vehicle based on sensor information from an external sensor that detects an external situation of the autonomous driving vehicle. The system includes a transmission information limitation unit configured to set a range of information to be transmitted to the remote commander among the sensor information detected by the external sensor, as a limited information range, based on the external environment or an external situation obtained based on map information and a trajectory of the autonomous driving vehicle.

In the vehicle remote instruction system, the transmission information limitation unit sets the range of information to be transmitted to the remote commander as the limited information range, and thus, among the sensor information detected by the external sensor, only the sensor information according to the external environment and trajectory of the autonomous driving vehicle (necessary sensor information) can be transmitted to the remote commander. In this way, the vehicle remote instruction system can appropriately issue the remote instruction by the remote commander R, and it is possible to reduce the data capacity of the sensor information transmitted to the remote commander from the autonomous driving vehicle.

In the vehicle remote instruction system, the external sensor may be configured to include a plurality of sensors for detecting the external environment. The transmission information limitation unit may be configured to determine the sensor that transmits the sensor information to the remote commander among the plurality of sensors based on the external situation and the trajectory, and set the sensor information detected by the determined sensor as the sensor information within the limited information range.

As described above, even if a plurality of sensors are included in the external sensor, the vehicle remote instruction system determines a sensor that is to transmit the sensor information according to the external situation, and sets the sensor information detected by the determined sensor as the sensor information within the limited information range. Therefore, it is possible to reduce the data capacity of the sensor information transmitted to the remote commander.

In the vehicle remote instruction system, the transmission information limitation unit may be configured to extract a portion to be transmitted to the remote commander based on the external situation and the trajectory, from the sensor information detected by the external sensor, and set the sensor information of the extracted portion as the sensor information within the limited information range.

As described above, from the sensor information of the external sensor, the vehicle remote instruction system extracts the portion to be transmitted, and sets the extracted portion as the sensor information within the limited information range. Therefore, it is possible to reduce the data capacity of the detection information transmitted to the remote commander.

The vehicle remote instruction system may further include: an information presence or absence determination unit configured to determine whether or not necessary information set in advance according to the external situation is included in the sensor information within the limited information range; and a notification and proposal unit configured to notify the remote commander, or propose the remote commander to change a position and posture of the autonomous driving vehicle or to change a detection area of the external sensor, if it is determined by the information presence or absence determination unit that the necessary information is not included in the sensor information within the limited information range.

In this case, the vehicle remote instruction system can notify the remote commander of a fact that the necessary information is not included in the limited information range, or can propose the remote commander that the necessary information is not included in the limited information range, and thus, it is necessary to change the position and posture of the autonomous driving vehicle or to change the detection area of the external sensor. In this way, the remote commander can take a corresponding action based on the notification or the proposal from the vehicle remote instruction system.

According to the present disclosure, it is possible to reduce the data capacity of the sensor information transmitted to the remote commander according to the external environment of an autonomous driving vehicle.

BRIEF DESCRIPTION OF THE DRAWINGS

FIG. 6A is a schematic diagram illustrating setting of the limited information range when the autonomous driving vehicle goes straight through an intersection in a narrow road where the traffic signal is not installed.

FIG. 6B is a schematic diagram illustrating a change in the detection area when the position and posture of the autonomous driving vehicle is changed.

DETAILED DESCRIPTION

Hereinafter, embodiments of the present disclosure will be described with reference to the drawings. In the following description, the same reference symbols will be given to the same or corresponding elements and the descriptions thereof will not be repeated.

Figure 1:
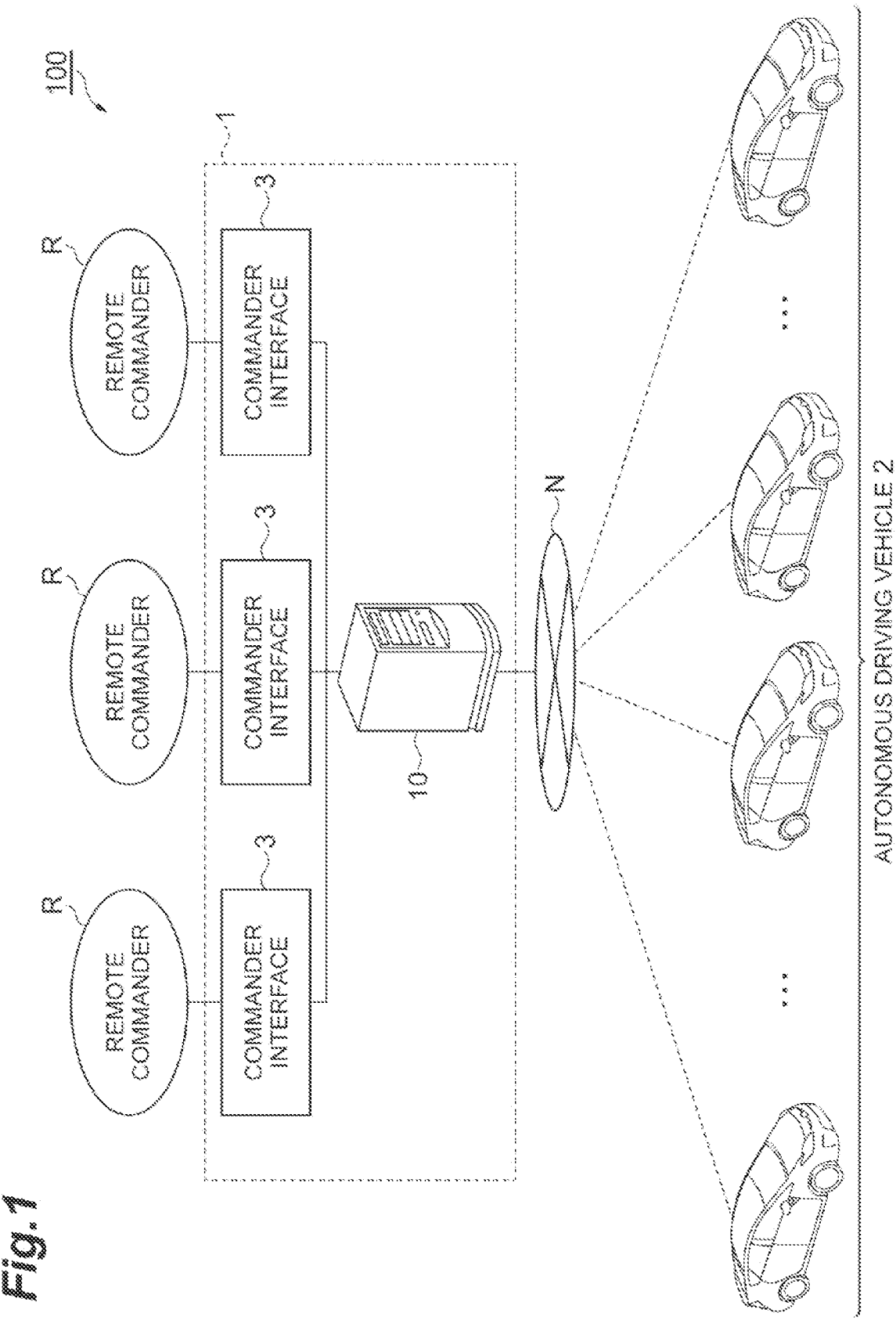
FIG. 1 is a diagram illustrating an example of an overall image of a vehicle remote instruction system according to an embodiment.

FIG. 1 is a diagram illustrating an example of an overall image of a vehicle remote instruction system according to an embodiment. A vehicle remote instruction system 100 illustrated in FIG. 1 is a system in which a remote commander R issues a remote instruction relating to travel of an autonomous driving vehicle 2 based on detection information of an external sensor 22 that detects an external environment of the autonomous driving vehicle 2. The remote instruction is an instruction from the remote commander R relating to the travel of the autonomous driving vehicle 2.

The remote instruction includes an instruction to the autonomous driving vehicle 2 to progress and an instruction for the autonomous driving vehicle 2 to stop. The remote instruction may include an instruction for the autonomous driving vehicle 2 to change the lane. In addition, the remote instruction may include an instruction to perform an offset avoidance on an obstacle ahead, an instruction to overtake a preceding vehicle, an instruction to perform an emergency evacuation, and the like.

Configuration of Vehicle Remote Instruction System

As illustrated in FIG. 1, a vehicle remote instruction system 100 includes a remote instruction apparatus 1 to which a remote commander R inputs a remote instruction. The remote instruction apparatus 1 is communicably connected to a plurality of autonomous driving vehicles 2 via a network N. The network N is a wireless communication network. Various kinds of information are sent to the remote instruction apparatus 1 from the autonomous driving vehicle 2.

In the vehicle remote instruction system 100, for example, in response to a remote instruction request from the autonomous driving vehicle 2, the remote commander R is requested to input the remote instruction. The remote commander R inputs the remote instruction to the commander interface 3 of the remote instruction apparatus 1. The remote instruction apparatus 1 transmits the remote instruction to the autonomous driving vehicle 2 through the network N. The autonomous driving vehicle 2 travels autonomously according to the remote instruction.

In the vehicle remote instruction system 100, the number of remote commanders R may be one, or two or more. The number of the autonomous driving vehicles 2 that can communicate with the vehicle remote instruction system 100 is not particularly limited. A plurality of remote commanders R may alternately issue the remote instruction for one autonomous driving vehicle 2, or one remote commander R may issue the remote instruction for equal to or more than two autonomous driving vehicles 2.

Configuration of Autonomous Driving Vehicle

Figure 2:
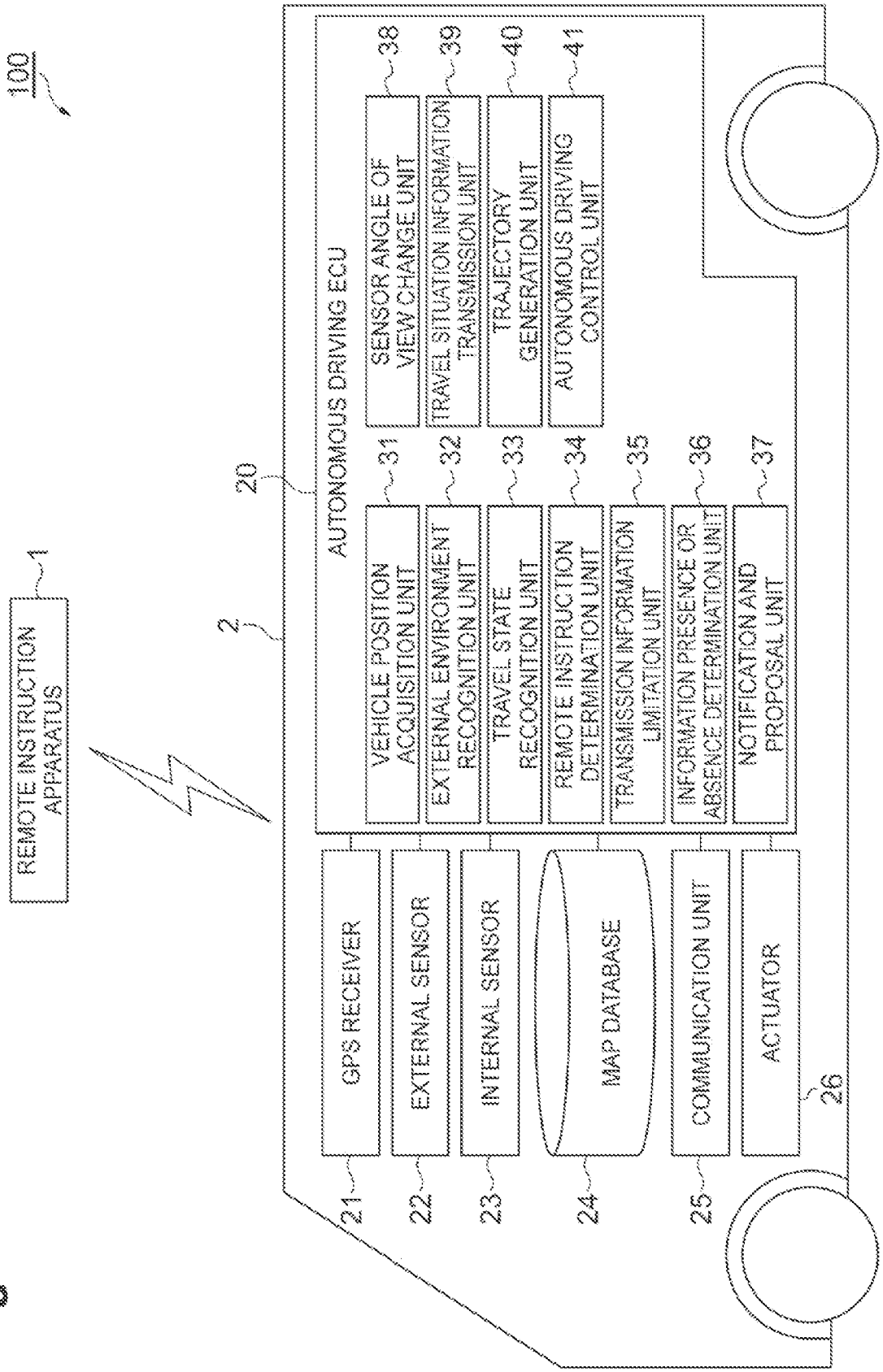
FIG. 2 is a block diagram illustrating an example of a configuration of the autonomous driving vehicle.

First, an example of a configuration of the autonomous driving vehicle 2 will be described. FIG. 2 is a block diagram illustrating an example of the configuration of the autonomous driving vehicle 2. As illustrated in FIG. 2, the autonomous driving vehicle 2 includes an autonomous driving ECU 20 as an example. The autonomous driving ECU 20 is an electronic control unit including a central processing unit (CPU), a read only memory (ROM), a random access memory (RAM), and the like. In the autonomous driving ECU 20, for example, a program recorded in the ROM is loaded into the RAM, and various functions are realized by executing the program loaded into the RAM by the CPU. The autonomous driving ECU 20 may be composed of a plurality of electronic units.

The autonomous driving ECU 20 is connected to a global positioning system (GPS) receiver 21, an external sensor 22, an internal sensor 23, a map database 24, a communication unit 25, and an actuator 26.

The GPS receiver 21 measures a position of the autonomous driving vehicle 2 (for example, latitude and longitude of the autonomous driving vehicle 2) by receiving signals from equal to or more than three GPS satellites. The GPS receiver 21 transmits the position information of the autonomous driving vehicle 2 to the autonomous driving ECU 20.

The external sensor 22 is a vehicle-mounted sensor that detects an external environment of the autonomous driving vehicle 2. The external sensor 22 transmits the detected detection information (sensor information) to the autonomous driving ECU 20. The external sensor 22 includes a plurality of sensors that detect the external environment. Specifically, the external sensor 22 includes at least a camera as the sensor. The camera is an imaging device that captures an image of the external environment of the autonomous driving vehicle 2. The camera is provided on the inside of a windshield of the autonomous driving vehicle 2 and images the front direction of the vehicle. The camera transmits the captured image (sensor information) relating to the external environment of the autonomous driving vehicle 2 to the autonomous driving ECU 20. The camera may be a monocular camera or may be a stereo camera. In addition, a plurality of cameras may be provided, and may image all or a part of the surroundings such as the left and right side directions and the rear side direction, in addition to the front direction of the autonomous driving vehicle 2.

The external sensor 22 may include a radar sensor as a sensor. The radar sensor is a detection device that detects an object around the autonomous driving vehicle 2 using radio waves (for example, millimeter waves) or light. The radar sensor includes, for example, millimeter wave radar or a light detection and ranging (LIDAR) as a sensor. The radar sensor transmits the radio wave or light to the surroundings of the autonomous driving vehicle 2, and detects the objects by receiving the radio waves or the light reflected from the objects. The radar sensor transmits the detected object information (sensor information) to the autonomous driving ECU 20. The objects include fixed objects such as guardrails and buildings, and moving objects such as pedestrians, bicycles, other vehicles, and the like. A plurality of radar sensors are provided, and all or at least a part of the surroundings of the autonomous driving vehicle 2 is to be detected. In addition, the external sensor 22 may include a sonar sensor that emits a sound wave around the autonomous driving vehicle 2 and detects a sound wave reflected from the obstacle or the like.

The internal sensor 23 is a vehicle-mounted sensor that detects a travel state of the autonomous driving vehicle 2. The internal sensor 23 includes a vehicle speed sensor, an accelerator sensor, and a yaw rate sensor. The vehicle speed sensor is a measurement device that measures a speed of the autonomous driving vehicle 2. As a vehicle speed sensor, for example, a vehicle wheel speed sensor is used, which is provided on vehicle wheels of the autonomous driving vehicle 2 or on a drive shaft rotating integrally with vehicle wheels, and measures a rotational speed of the vehicle wheels. The vehicle speed sensor transmits the measured vehicle speed information (vehicle wheel speed information) to the autonomous driving ECU 20.

The accelerator sensor is a measurement device that measures an acceleration of the autonomous driving vehicle 2. The accelerator sensor includes, for example, a longitudinal accelerator sensor that measures acceleration in the longitudinal direction of the autonomous driving vehicle 2 and the accelerator sensor may include a lateral accelerator sensor that measures a lateral acceleration of the autonomous driving vehicle 2. The accelerator sensor transmits, for example, acceleration information of the autonomous driving vehicle 2 to the autonomous driving ECU 20. The yaw rate sensor is a measurement device that measures a yaw rate (rotation angular velocity) around the vertical axis at the center of gravity of the autonomous driving vehicle 2. As the yaw rate sensor, for example, a Gyro sensor can be used. The yaw rate sensor transmits the measured yaw rate information of the autonomous driving vehicle 2 to the autonomous driving ECU 20.

The autonomous driving vehicle 2 may include a remote instruction sensor for the remote commander in addition to the external sensor 22. The remote instruction sensor may be provided to have an angle of view different from that of the sensor of the external sensor 22. The remote instruction sensor may be provided, for example, on a roof of the autonomous driving vehicle 2 and detect the surroundings from a high position. The remote instruction sensor may have a lower resolution and a smaller data capacity than that of the external sensor 22 that recognizes an external environment for performing the autonomous driving. In this way, when transmitting the result of detection by the remote instruction sensor to the remote instruction server 10, the data capacity can be reduced, and the occurrence of delay can be suppressed.

The map database 24 is a database that records map information. The map database 24 is formed, for example, in a recording device such as a hard disk drive (HDD) mounted on the autonomous driving vehicle 2. The map information includes information on the position of the road, information on the shape of the road (for example, curvature information) and information on the position of the intersection and the branch. The map information may include traffic regulation information such as a legal speed associated with the position information. The map information may include target object information used for acquiring the position information of the autonomous driving vehicle 2. As the target object, road signs, road markings, traffic signals, utility poles, and the like can be used. The map database 24 may be configured as a server that can communicate with the autonomous driving vehicle 2.

The communication unit 25 is a communication device that controls the wireless communication with the outside of the autonomous driving vehicle 2. The communication unit 25 transmits and receives various information to and from the remote instruction apparatus 1 (the remote instruction server 10) via the network N.

The actuator 26 is a device used for controlling the autonomous driving vehicle 2. The actuator 26 includes at least a drive actuator, a brake actuator and a steering actuator. The drive actuator controls a driving force of the autonomous driving vehicle 2 by controlling an amount of air (throttle opening degree) supplied to the engine according to a control signal from the autonomous driving ECU 20. If the autonomous driving vehicle 2 is a hybrid vehicle, in addition to the amount of air supplied to the engine, the control signal from the autonomous driving ECU 20 is input to a motor as a power source, and then, the driving force is controlled. If the autonomous driving vehicle 2 is an electric vehicle, the control signal from the autonomous driving ECU 20 is input to a motor as a power source, and then, the driving force is controlled. The motor as the power source in these cases configures the vehicle actuator 26.

The brake actuator controls a brake system according to a control signal from the autonomous driving ECU 20 and controls a braking force applied to the vehicle wheels of the autonomous driving vehicle 2. For example, a hydraulic brake system can be used as the brake system. The steering actuator controls the driving of an assist motor controlling a steering torque of an electric power steering system according to a control signal from the autonomous driving ECU 20. In this way, the steering actuator controls the steering torque of the autonomous driving vehicle 2.

Next, an example of a functional configuration of the autonomous driving ECU 20 will be described. The autonomous driving ECU 20 includes a vehicle position acquisition unit 31, an external environment recognition unit 32, a travel state recognition unit 33, a remote instruction determination unit 34, a transmission information limitation unit 35, an information presence or absence determination unit 36, a notification and proposal unit 37, a sensor angle of view change unit 38, a travel situation information transmission unit 39, a trajectory generation unit 40, and an autonomous driving control unit 41.

The vehicle position acquisition unit 31 acquires position information of the autonomous driving vehicle 2 based on the position information from the GPS receiver 21 and the map information on the map database 24. In addition, the vehicle position acquisition unit 31 may acquire the position information of the autonomous driving vehicle 2 using the target object information included in the map information on the map database 24 and the result of detection performed by the external sensor 22 using the simultaneous localization and mapping (SLAM) technology. The vehicle position acquisition unit 31 may recognize a lateral position of the autonomous driving vehicle 2 relative to a lane (the position of the autonomous driving vehicle 2 in the lane width direction) from a position relationship between lane marking lines and the autonomous driving vehicle 2, and then, may include the lateral position in the position information. The vehicle position acquisition unit 31 may acquire the position information of the autonomous driving vehicle 2 using another known method.

The external environment recognition unit 32 recognizes the external environment of the autonomous driving vehicle 2 based on the result of detection performed by the external sensor 22. The external environment includes a relative position of surrounding objects relative to the autonomous driving vehicle 2. The external environment may include the relative speed and moving direction of the surrounding objects relative to the autonomous driving vehicle 2. The external environment may include types of the objects such as other vehicles, pedestrians, and bicycles. The types of the object can be identified by a known method such as pattern matching. The external environment may include a result of recognition of the marking lines (lane line recognition) around the autonomous driving vehicle 2. The external environment may include a result of recognition of a lighting state of a traffic signal. The external environment recognition unit 32 can recognize the lighting state of the traffic signal (the lighting state in which the vehicle can pass or the lighting state in which the vehicle is not allowed to pass) in the front direction of the autonomous driving vehicle 2 based on, for example, the image from the camera of the external sensor 22.

The travel state recognition unit 33 recognizes the travel state of the autonomous driving vehicle 2 based on the result of detection performed by the internal sensor 23. The travel state includes the vehicle speed of autonomous driving vehicle 2, the acceleration of autonomous driving vehicle 2, and the yaw rate of autonomous driving vehicle 2. Specifically, the travel state recognition unit 33 recognizes the vehicle speed of the autonomous driving vehicle 2 based on the vehicle speed information from the vehicle speed sensor. The travel state recognition unit 33 recognizes the acceleration of the autonomous driving vehicle 2 based on the vehicle speed information from the accelerator sensor. The travel state recognition unit 33 recognizes the orientation of the autonomous driving vehicle 2 based on the yaw rate information from the yaw rate sensor.

The remote instruction determination unit 34 determines whether a remote instruction request to the remote commander R (remote instruction apparatus 1) from the autonomous driving vehicle 2 is required or not. The remote instruction determination unit 34 determines whether the remote instruction request is required or not based on at least one of the position information of the autonomous driving vehicle 2 acquired by the vehicle position acquisition unit 31 and the map information on the map database 24, the external environment recognized by the external environment recognition unit 32, and the trajectory generated by the trajectory generation unit 40 described later.

When the autonomous driving vehicle 2 is in a remote instruction required situation, the remote instruction determination unit 34 determines that the remote instruction request is required. The remote instruction required situation is a situation set in advance as a situation in which the remote instruction request to the remote instruction apparatus 1 from the autonomous driving vehicle is required.

The remote instruction required situation may include, for example, at least one of a situation in which the autonomous driving vehicle 2 is turning right or left at the intersection, a situation of entering the intersection with or without a traffic signal, a situation of entering the roundabout, a situation of passing the pedestrian crossing, a situation in which a stopped vehicle or an obstacle is present ahead, a situation of changing the lane to avoid the construction site, a situation in which a determination of offset avoidance for the obstacles ahead is required, a situation in which the stopped autonomous driving vehicle starts, and a situation in which the autonomous driving vehicle stops at a boarding location or a destination. In a case of a country or a region of a vehicle's right-side traffic, a situation of turning right at the intersection may be replaced by a situation of turning left at the intersection.

For example, if the autonomous driving vehicle 2 is in a situation of entering the intersection or turning right at the intersection, the remote instruction determination unit 34 determines that the remote instruction request is required. The remote instruction determination unit 34 may determine that the remote instruction request is required if an obstacle for which the offset avoidance is required is present in the front direction of the autonomous driving vehicle 2.

The remote instruction determination unit 34 can recognize that the autonomous driving vehicle 2 is in the situation of turning right at the intersection, the autonomous driving vehicle 2 is in the situation of approaching the intersection with a traffic signal, or the autonomous driving vehicle 2 is in the situation of starting the lane change, from the position information, the map information, and the target route of the autonomous driving vehicle 2, for example.

If it is determined that the remote instruction request is required, the remote instruction determination unit 34 requests the remote instruction server 10 for the remote instruction by the remote commander R. The request for the remote instruction includes, for example, identification information on the autonomous driving vehicle 2. The remote instruction determination unit 34 may request for the remote instruction with a margin time in advance. When a distance between the intersection or the like subject to the remote instruction and the autonomous driving vehicle 2 is equal to or shorter than a certain distance, the remote instruction determination unit 34 may determine that the remote instruction request is required. The remaining time for arrival may be used instead of the distance.

When it is determined by the remote instruction determination unit 34 that the request for remote instruction is necessary (when it is the remote instruction required situation), the transmission information limitation unit 35 sets travel situation information on the autonomous driving vehicle 2 to be transmitted to the remote instruction server 10. The travel situation information on the autonomous driving vehicle 2 is used when the remote commander R issues the remote instruction. The travel situation information on the autonomous driving vehicle 2 will be described in detail later, and the travel situation information includes detection information from the external sensor 22. In the present embodiment, the transmission information limitation unit 35 sets a range of information to be transmitted to the remote instruction server 10 among the detection information on the external sensor 22 included in the travel situation information.

Specifically, the transmission information limitation unit 35 sets the range of the information to be transmitted to the remote instruction server 10 (remote commander R) among the detection information detected by the external sensor 22 as the limited information range, based on the external situation of the autonomous driving vehicle 2 and a trajectory of the autonomous driving vehicle 2.

The external situation of the autonomous driving vehicle 2 can be obtained based on the external environment or the map information. The transmission information limitation unit 35 uses the external environment obtained based on the detection information detected by the external sensor 22 (that is, the external environment recognized by the external environment recognition unit 32), as the external environment of the autonomous driving vehicle 2. The map information used by the transmission information limitation unit 35 is the map information stored in the map database 24. The transmission information limitation unit 35 can use the trajectory generated by the trajectory generation unit 40 as the trajectory. The trajectory here is a trajectory before the trajectory corresponding to the remote instruction is generated.

The limited information range is a range that is more limited than the detection information by the external sensor 22 transmitted to the remote instruction server 10 when the range of information based on the external situation and the trajectory is not set. As described above, by setting the range of the transmitted detection information as the limited information range, the data capacity of the transmitted detection information is reduced compared to a case where the range is not set based on the external environment and the trajectory.

The transmission information limitation unit 35 sets the detection information by the sensor of which the detection area includes an area to be confirmed when the remote commander R issues the remote instruction, as the information on the limited information range, based on the external situation and the trajectory.

(The Limited Information Range is Set after Determining the Sensor that Transmits the Detection Information.)

Hereinafter, a method of determining the sensor that transmits detection information to the remote commander R among a plurality of sensors included in the external sensor 22, and then, setting the detection information detected by the determined sensor as the detection information within the limited information range, will be described.

First, an example of setting the limited information range using the external situation obtained based on the map information will be described. The transmission information limitation unit 35 determines the sensor that transmits the detection information to the remote instruction server 10 among a plurality of sensors included in the external sensor 22, based on the map information and the trajectory. Then, the transmission information limitation unit 35 can set the detection information detected by the determined sensor, as the detection information within the limited information range.

Figure 3:
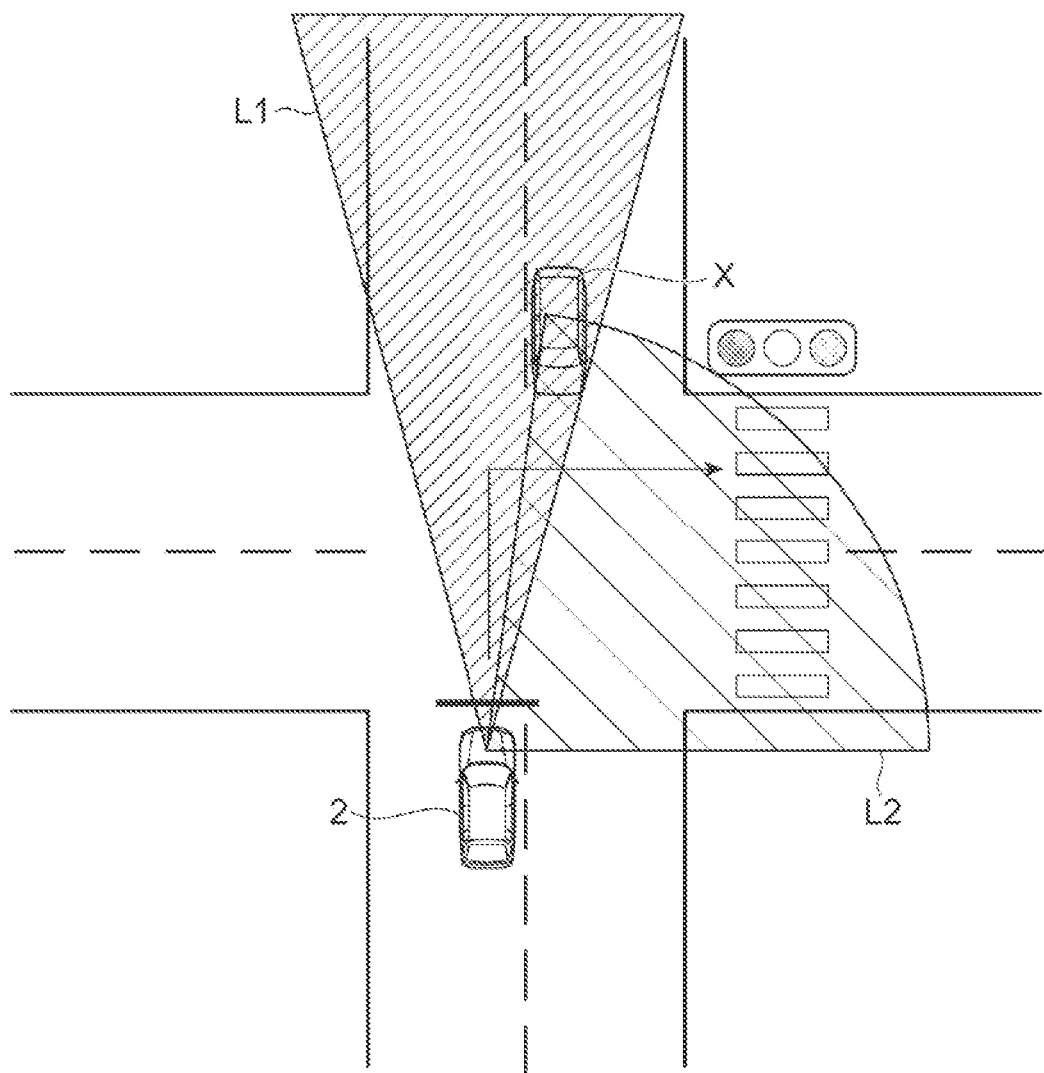
FIG. 3 is a schematic diagram illustrating setting of a limited information range when the autonomous driving vehicle turns right at an intersection.

As an example, a case where the autonomous driving vehicle 2 turns right at an intersection as illustrated in FIG. 3 will be described. In this case, as an example, when issuing the remote instruction, the remote commander R needs to confirm the absence of both a vehicle coming straight in the oncoming lane and a pedestrian crossing the road that is a destination of the right turn. Therefore, the transmission information limitation unit 35 determines that the autonomous driving vehicle 2 is in a situation of turning right at the intersection, based on the map information, the position information of the autonomous driving vehicle 2 acquired by the vehicle position acquisition unit 31, and the trajectory. Then, the transmission information limitation unit 35 selects (determines) a sensor of which the detection area is front and a sensor of which the detection area is right front (diagonally right front) among a plurality of sensors included in the external sensor 22.

If there is a sensor of which the detection area is both the front and right front, the transmission information limitation unit 35 may select that sensor. That is, the transmission information limitation unit 35 selects one or a plurality of sensors having a region to be confirmed by the remote commander R as the detection area (the same applies to the selection of a sensor described below). Then, the transmission information limitation unit 35 can set the detection information detected by the selected sensor as the detection information within the limited information range. In FIG. 3, a hatched area around the autonomous driving vehicle 2 indicates the detection area (angle of view) of each sensor included in the external sensor 22 (the same applies to other drawings).

As described above, in the above example, the transmission information limitation unit 35 does not include the detection information by the sensor of which the detection area is rear direction, in the limited information range. That is, the transmission information limitation unit 35 does not include the detection information by the sensor of which the detection area does not include the area to be checked by the remote commander R, into the limited information range, based on the external situation obtained based on the map information.

Here, since it is sufficient to only be able to detect the vehicle coming straight in the oncoming lane and the pedestrians crossing the road that is the destination of the right turn, the transmission information limitation unit 35 may select any type of the sensors (a sensor of which the detection information is included in the limited information range) such as a camera, radar, or LIDAR, which are exemplified as an example of sensors included in the external sensor 22.

Next, an example of setting the limited information range using the external situation obtained based on the external environment will be described. The transmission information limitation unit 35 determines a sensor that transmits the detection information to the remote instruction server 10 from a plurality of sensors included in the external sensor 22 based on the external environment and the trajectory of the autonomous driving vehicle 2 recognized by the external environment recognition unit 32. Then, the transmission information limitation unit 35 can set the detection information detected by the determined sensor, as the detection information within the limited information range.

Figure 4C:
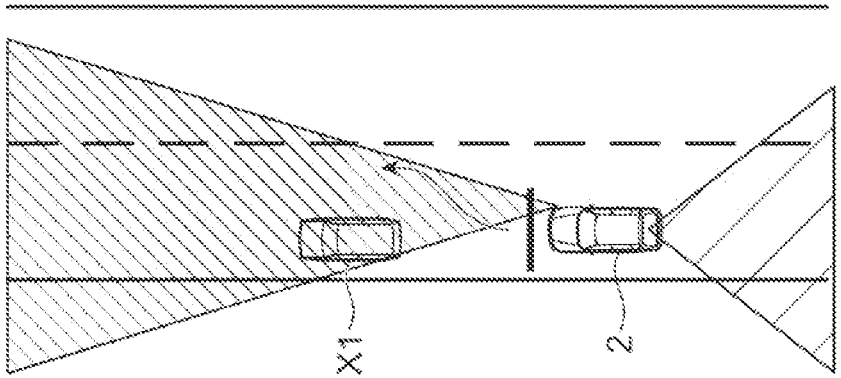
FIG. 4C is a schematic diagram illustrating a change in the detection area when the detection area of the external sensor is changed.
Figure 4B:
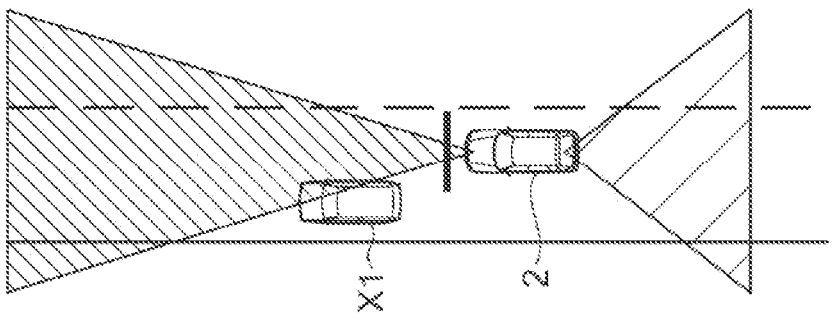
FIG. 4B is a schematic diagram illustrating a change in a detection area when a position and posture of the autonomous driving vehicle is changed.
Figure 4A:
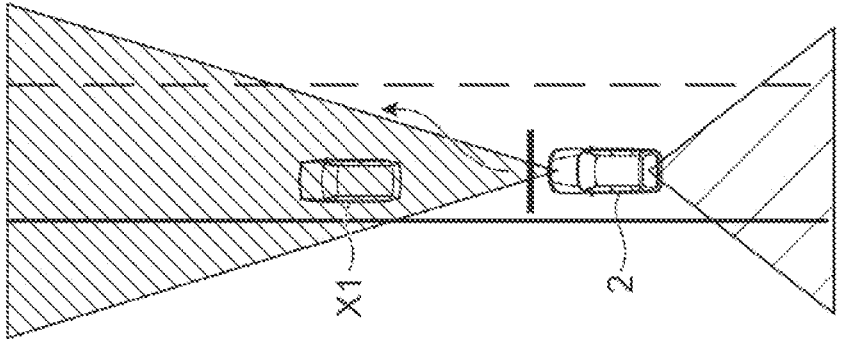
FIG. 4A is a schematic diagram illustrating setting of the limited information range when overtaking a stopped vehicle that stops on a traveling lane of the autonomous driving vehicle.

As an example, as illustrated in FIG. 4A, a case of overtaking a stopped vehicle X1 that is stopped on the traveling lane of the autonomous driving vehicle 2 will be described. In this case, as an example, when the remote commander R issues the remote instruction to overtake the stopped vehicle X1, it is necessary to confirm the absence of both the oncoming vehicle (in a case of one-lane road for each side) that comes straight in the oncoming lane in the front direction of the autonomous driving vehicle 2 and a vehicle that is trying to overtake the autonomous driving vehicle 2 and the stopped vehicle X1 from behind the autonomous driving vehicle 2. Therefore, the transmission information limitation unit 35 recognizes that the autonomous driving vehicle 2 is in a situation of overtaking the stopped vehicle X1 based on the information (external environment) on the stopped vehicle X1 detected by the external environment recognition unit 32 and the trajectory. Then, the transmission information limitation unit 35 selects (determines) a sensor of which the detection area is the front and a sensor of which the detection area is the rear direction of the autonomous driving vehicle 2 from a plurality of sensors included in the external sensor 22. The transmission information limitation unit 35 can set the detection information detected by the selected sensor as the detection information within the limited information range.

As described above, the transmission information limitation unit 35 does not include the detection information by the sensor that does not include the area to be confirmed by the remote commander R in the detection area, in the limited information range, based on the external situation obtained based on the external environment.

Here, since it is sufficient to only be able to detect the vehicles in front of and rear direction of the autonomous driving vehicle 2, the transmission information limitation unit 35 may select any type of the sensors that are described as an example of the sensors such as a camera, a radar, or a LIDAR.

The transmission information limitation unit 35 may set the limited information range using the external situation and the external situation obtained based on the map information. Specifically, as an example, as illustrated in FIG. 3, when the autonomous driving vehicle 2 turns right at the intersection, the limited information range may be set based on the presence or absence of an oncoming vehicle X waiting for the right turn in the oncoming lane of the autonomous driving vehicle 2.

For example, the oncoming vehicle X waiting for the right turn is present, an oncoming straight lane (straight lane in the oncoming lane) positioned on the rear side of the oncoming vehicle X (the rear side when viewed from the autonomous driving vehicle 2) is shielded by the oncoming vehicle X. Therefore, it becomes difficult to perform the detection by the external sensor 22, and thus, the performance of recognizing other vehicles and the like deteriorates. In such a case, the autonomous driving vehicle 2 may travel based on the remote instruction from the remote commander R. However, if the oncoming vehicle X waiting for the right turn is not present in the oncoming lane in the front direction of the autonomous driving vehicle 2, the autonomous driving vehicle 2 can autonomously perform the right turn automatically by the autonomous driving. Therefore, as an example, when turning right at the intersection, when the oncoming vehicle X waiting for the right turn is not recognized by the external environment recognition unit 32 in the front direction of the autonomous driving vehicle 2, among a plurality of sensors included in the external sensor 22, the transmission information limitation unit 35 may set only the detection information by the sensor of which the detection area is the right front, as the detection information within the limited information range, without including the detection information by a sensor of which the detection area is the front, in the limited information range.

Similarly, in a case illustrated in FIG. 3, if a pedestrian trying to cross the road that is the destination of the right turn is not recognized by the external environment recognition unit 32, the transmission information limitation unit 35 may not include the detection information by the sensor of which the detection area is the right front, in the detection information within the limited information range. That is, if the pedestrians trying to cross the road that is the destination of the right turn is not present, since the remote commander R does not need to check the pedestrians, the transmission information limitation unit 35 may not include the detection information by the sensor of which the detection area is the right front, as the detection information within the limited information range.

(Set the Limited Information Range by Extracting a Transmitted Portion from the Detection Information)

Hereinafter, a method of extracting a portion to be transmitted to the remote commander R from the detection information detected by the external sensor 22 and setting the detection information on the extracted portion as the detection information within the limited information range will be described.

First, an example of setting the limited information range using the external situation obtained based on the map information will be described. The transmission information limitation unit 35 extracts a portion to be transmitted to the remote instruction server 10 from the detection information detected by the external sensor 22, based on the map information and the trajectory. Then, the transmission information limitation unit 35 can set the detection information on the extracted portion as the detection information within the limited information range. Here, extracting the portion to be transmitted to the remote instruction server 10 from the detection information means, for example, cutting out an unnecessary portion of the detection information and leaving only the necessary portion (a portion to be transmitted). As an example, the transmission information limitation unit 35 can extract a part of an image captured by the camera included in the external sensor 22 and can use the portion as a portion to be transmitted.

Figure 5:
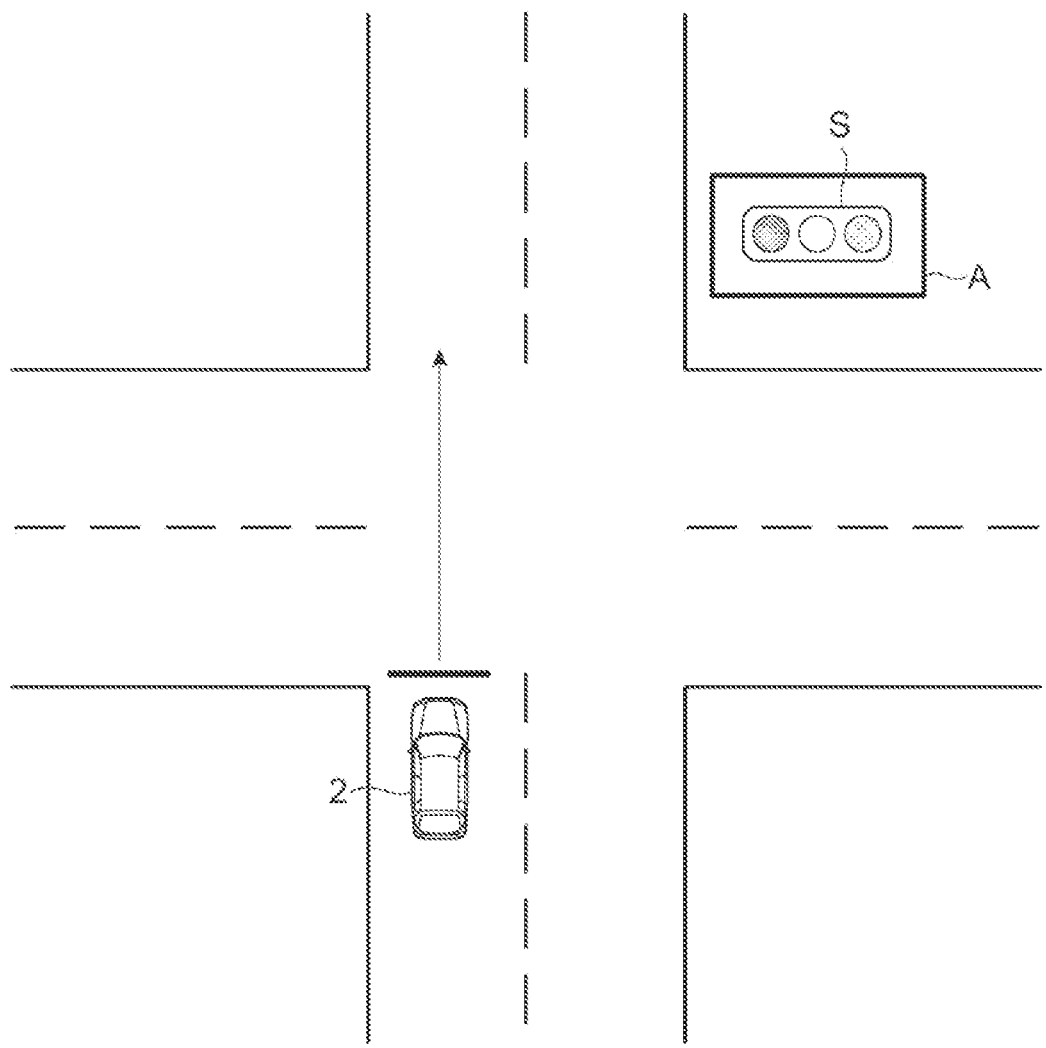
FIG. 5 is a schematic diagram illustrating setting of the limited information range when the autonomous driving vehicle 2 goes straight through the intersection where the traffic signal is installed.

As an example, a case where the autonomous driving vehicle 2 goes straight through an intersection where a traffic signal is installed as illustrated in FIG. 5 will be described. In this case, for example, the remote commander R needs to confirm the lighting information on the traffic signal (color information of the lit signal) when issuing the remote the remote instruction. Therefore, the transmission information limitation unit 35 determines that the autonomous driving vehicle 2 is in a situation of going straight through the intersection where the traffic signal is installed based on the map information, the position information on the autonomous driving vehicle 2 acquired by the vehicle position acquisition unit 31, and the trajectory. Then, the transmission information limitation unit 35 selects (determines) a sensor of which the detection area includes the traffic signal, from the plurality of sensors included in the external sensor 22. In addition, in this case, the transmission information limitation unit 35 selects a camera as a sensor such that the color of the lit signal can be determined. Then, the transmission information limitation unit 35 can extract a portion (pixel) including a light projection unit S of the traffic signal from the image (detection information) captured by the selected camera, and can set the extracted image A as the detection information within the limited information range. For example, the position of the light projection unit S of the traffic signal (such as the height from the road surface) may be included in the map information.

Next, an example of setting the limited information range using the external situation obtained based on the external environment will be described. The transmission information limitation unit 35 extracts a portion to be transmitted to the remote instruction server 10 from the detection information detected by the external sensor 22, based on the external environment recognized by the external environment recognition unit 32 and the trajectory. Then, the transmission information limitation unit 35 can set the detection information on the extracted portion as the detection information within the limited information range.

As an example, as illustrated in FIG. 4A, a case of overtaking a stopped vehicle X1 that is stopped on the traveling lane of the autonomous driving vehicle 2 will be described. In addition, here, it is assumed that the external sensor 22 includes a sensor of which the detection area is the entire circumference of the autonomous driving vehicle 2, or a sensor of which the detection area is a range 180° front side around the autonomous driving vehicle 2 and a sensor of which the detection area is a range of 180° rear side. In this case, the transmission information limitation unit 35 determines that the autonomous driving vehicle 2 is in a situation of overtaking the stopped vehicle X1 based on the information (external environment) of the stopped vehicle X1 detected by the external environment recognition unit 32 and the trajectory. Then, the transmission information limitation unit 35 extracts, a portion including the area in the front direction of the autonomous driving vehicle 2 and a portion including the area of the rear from the detection information of the external sensor 22, and can set the detection information on the extracted portion as the detection information within the limited information range. Here, the transmission information limitation unit 35 does not extract the detection information of the portion including the area of left and right side of the autonomous driving vehicle 2, as the detection information within the limited information range.

The transmission information limitation unit 35 may set the limited information range using the external situation and the external situation obtained based on the map information. Specifically, as an example, a case where the autonomous driving vehicle 2 turns right at the intersection as illustrated in FIG. 3 will be described. Here, it is assumed that the external sensor 22 includes a sensor of which the detection area is a range of 180° front side around the autonomous driving vehicle 2. In this case, the transmission information limitation unit 35 extracts a portion to be transmitted to the remote commander from the detection information based on the presence or absence of vehicles such as an oncoming vehicle X waiting for the right turn in the oncoming lane of the autonomous driving vehicle 2.

Specifically, as an example, when turning right at the intersection, when a vehicle such as the oncoming vehicle X is not recognized in the front direction of the autonomous driving vehicle 2 by the external environment recognition unit 32, the transmission information limitation unit 35 may not extract the portion (the portion of the detection area L1 in FIG. 3) in the front direction of the autonomous driving vehicle 2 from the detection information by the sensor of which the detection area is a range of 180° in the front direction of the autonomous driving vehicle 2, but may extract only the portion (the portion of the detection area L2 in FIG. 3) including the right front side, and then, may set the detection information of the extracted portion as the detection information within the limited information range.

In the case illustrated in FIG. 3, if a pedestrian trying to cross the road that is the destination of the right turn is not recognized by the external environment recognition unit 32, the transmission information limitation unit 35 may not include the portion including the right front of the detection information as the detection information in the limited information range. If the presence or absence of a vehicle such as the oncoming vehicle X and a pedestrian crossing the road that is the destination of the right turn is not taken into consideration, the transmission information limitation unit 35 can extract a portion including the area of front and right side of the autonomous driving vehicle 2 from the detection information by the sensor of which the detection area is a range of 180° in the front direction of the autonomous driving vehicle 2, and can set the detection information on the extracted portion, as the detection information within the limited information range.

The information presence or absence determination unit 36 determines whether or not necessary information set in advance based on the external situation of the autonomous driving vehicle 2 is included in the detection information within the limited information range set by the transmission information limitation unit 35. That is, the necessary information is set in advance based on the external environment of the autonomous driving vehicle 2 recognized by the external environment recognition unit 32 or the map information.

The necessary information set based on the map information may be, for example, information set in advance according to a place where the autonomous driving vehicle 2 travels, such as an intersection. The necessary information in this case may include, for example, a direction or a place (a lane, a road, or the like) to be checked by the remote commander R and a target object to be checked (traffic signal, pedestrian crossing, or the like). In addition, the necessary information set based on the external environment may be, for example, set according to an object recognized by the external environment recognition unit 32, which is an object to be checked by the remote commander R. The necessary information in this case may include, for example, a target object to be checked by the remote commander R, which is a target object (a traffic guide or a guide board at a construction site) that is not included in the map information.

As an example of the necessary information set in advance based on the map information, a case where the autonomous driving vehicle 2 goes straight through the intersection where the traffic signal is not installed on a narrow road as illustrated in FIG. 6A will be described. In this case, when issuing the remote the remote instruction, the remote commander R needs to confirm the situation of a road R2 intersecting a road R1 on which the autonomous driving vehicle 2 travels (situations of the left and right sides of the autonomous driving vehicle 2). Therefore, for example, a road (the road R2) intersecting the traveling lane of the autonomous driving vehicle 2 is set in advance as the necessary information in such a situation.

In the example illustrated in FIG. 6A, the detection information by the sensor that detects the right side of the autonomous driving vehicle 2 and the detection information by the sensor that detects the left side among a plurality of sensors included in the external sensor 22 are set as the detection information within the limited information range by the transmission information limitation unit 35. The information presence or absence determination unit 36 determines whether or not the detection information detected by the external sensor 22 includes the situation of the road R2 based on the map information, the position information of the autonomous driving vehicle 2 acquired by the vehicle position acquisition unit 31, and the trajectory. In the example illustrated in FIG. 6A, walls W1 and W2 are installed on both sides of the road R1 on which the autonomous driving vehicle 2 travels. The detection area of the sensor that detects the right side of the autonomous driving vehicle 2 is shielded by the wall W1, and the detection area of the sensor that detects the left side is shielded by the wall W2. As a result, the situation of the road R2 cannot be detected by the sensor that detects the right side and the sensor that detects the left side. Therefore, the information presence or absence determination unit 36 determines that the necessary information is not included in the detection information within the limited information range.

Figure 7:
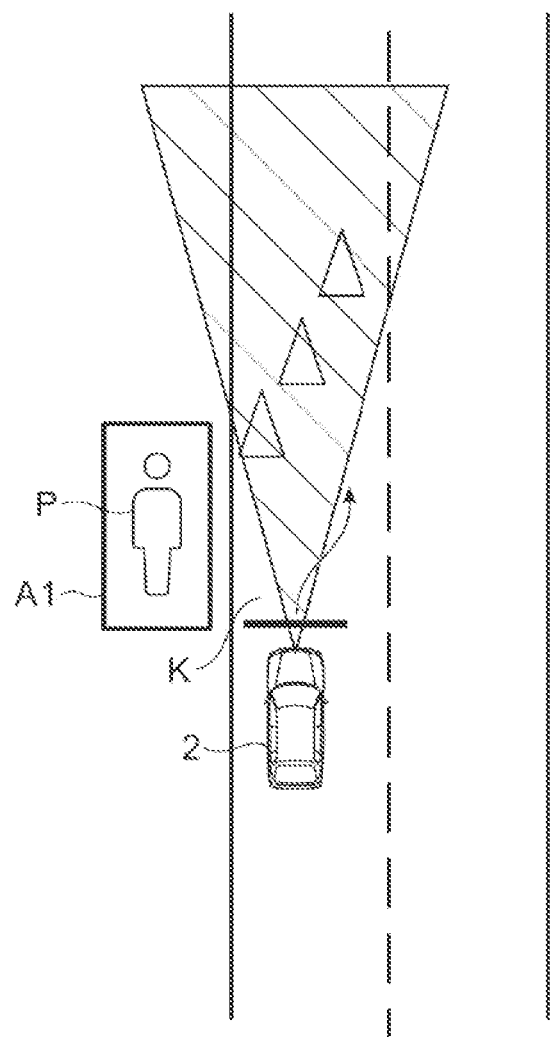
FIG. 7 is a schematic diagram illustrating setting of the limited information range when a construction site is present in the front direction of the autonomous driving vehicle.

As an example of the necessary information set in advance based on the external environment, a case where a construction site K is present in the front direction of the autonomous driving vehicle 2 and a traffic guide P guides the traffic in front of the construction site K as illustrated in FIG. 7, will be described. In this case, the remote commander R needs to check the guidance operation of the traffic guide P when issuing the remote the remote instruction. For this reason, for example, the traffic guide P is set in advance as the necessary information in such a situation. In addition, for example, a guide plate installed around the construction site K may be set in advance as the necessary information in such a situation.

In the example illustrated in FIG. 7, it is assumed that the traffic guide P is recognized by the external environment recognition unit 32. In this case, the information presence or absence determination unit 36 determines whether or not the traffic guide P is included in the detection information within the limited information range set by the transmission information limitation unit 35.

If it is determined by the information presence or absence determination unit 36 that the necessary information is not included in the detection information within the limited information range, the notification and proposal unit 37 notifies the remote commander R. Alternatively, the notification and proposal unit 37 proposes the change of the position and posture of the autonomous driving vehicle 2 or change of the detection area of the external sensor 22 to the remote commander R. When performing the notification and the proposal, the notification and proposal unit 37 can transmit this fact to the remote instruction server 10 and can perform the notification and the proposal via the commander interface 3 of the remote instruction apparatus 1.

Here, the change of the position and posture of the autonomous driving vehicle 2 means, for example, changing the position of the autonomous driving vehicle 2 or changing the position and orientation. Specifically, the change of the position and posture of the autonomous driving vehicle 2 may be, for example, causing the autonomous driving vehicle 2 to progress from the current place or causing the autonomous driving vehicle 2 to steer from the current place to the right or left while progressing. As the position and posture of the autonomous driving vehicle 2 is changed, the detection area of the external sensor 22 is changed.

The change of the detection area of the external sensor 22 may include, for example, a change of a mounting position and posture of the sensor included in the external sensor 22. The change of the mounting position and posture of the sensor includes, for example, at least any one of, for example, a change of a mounting angle (the direction of the sensor) of the sensor included in the external sensor 22 and/or a rotation of the sensor with the detection direction of the sensor as a rotation axis. In other words, the change of the mounting position and posture includes at least any one of the change of the yaw angle, the pitch angle, and the roll angle of the sensor. In addition, the change of the mounting position and posture may include translating the position of the sensor (sliding in at least one of the horizontal direction and the vertical direction).

Furthermore, the change of the detection area of the external sensor 22 may be, for example, a change of the range to be extracted from the detection area of the external sensor 22. In other words, the change of the detection area of the external sensor 22 may be, for example, a change of an interested portion extracted from the detection information.

The sensor angle of view change unit 38 changes the detection area of the external sensor 22. In the present embodiment, if an instruction to change the detection area of the external sensor 22 is issued by the remote commander R, the sensor angle of view change unit 38 changes the detection area of the external sensor 22 based on the instruction to change the detection area. Here, the sensor angle of view change unit 38 can fix the amount of change (the amount of change of the detection area) per one instruction to change the detection area. In this case, the remote commander R issues the instructions to change the detection area several times until the desired area is included in the detection area. In this way, even if the change instruction is delayed or interrupted, the detection area of the external sensor 22 can be appropriately changed while suppressing the detection area of the external sensor 22 from being in an unintended state.

If the autonomous driving vehicle 2 includes a remote instruction sensor for the remote commander, the sensor angle of view change unit 38 may change the detection area of the remote instruction sensor.

If it is determined by the remote instruction determination unit 34 that the remote instruction request is required, the travel situation information transmission unit 39 transmits the travel situation information of the autonomous driving vehicle 2 to the remote instruction server 10. The travel situation information on the autonomous driving vehicle 2 includes information for the remote commander R to recognize the situation of the autonomous driving vehicle 2. As described above, the range of the detection information by the external sensor 22 included in the travel situation information is set as the limited information range by the transmission information limitation unit 35.

Specifically, the travel situation information on the autonomous driving vehicle 2 includes the detection information by the vehicle-mounted sensor of the autonomous driving vehicle 2 and/or the information (for example, an overhead view image of the autonomous driving vehicle 2) generated from detection information by the vehicle-mounted sensor. The detection information by the vehicle-mounted sensor includes the detection information by the external sensor 22.

For example, the detection information by the external sensor 22 may include a camera image captured by the camera in the front direction of the autonomous driving vehicle 2. The detection information by the external sensor 22 may include a camera image captured by the camera around the autonomous driving vehicle 2 including the side and rear direction of the autonomous driving vehicle 2. In addition, the detection information by the external sensor 22 may include object information detected by the radar sensor. The detection information by the external sensor 22 may include the result of identification of the type of the object. The travel situation information may include information on the external environment of the autonomous driving vehicle 2 recognized by the external environment recognition unit 32 based on the detection information by the external sensor 22.

In addition, the detection information by the vehicle-mounted sensor may include the detection information by the internal sensor 23. The detection information by the internal sensor 23 may include information on the vehicle speed of the autonomous driving vehicle 2 detected by the vehicle speed sensor. The detection information by the internal sensor 23 may include information on the yaw rate of the autonomous driving vehicle 2 detected by the yaw rate sensor. The detection information by the internal sensor 23 may include information on the steering angle of the autonomous driving vehicle 2. The travel situation information may include information on the travel state of the autonomous driving vehicle 2 recognized by the travel state recognition unit 33 based on the detection information by the internal sensor 23.

Furthermore, the travel situation information on the autonomous driving vehicle 2 may include position information on the autonomous driving vehicle 2. The travel situation information on the autonomous driving vehicle 2 may include information on the occupants (presence or absence of the occupants or the number of occupants). The travel situation information on the autonomous driving vehicle 2 may include information on the trajectory according to the selectable remote instruction by the remote commander R. The trajectory will be described later.

The trajectory generation unit 40 generates a trajectory used for the autonomous driving of the autonomous driving vehicle 2. The trajectory generation unit 40 sets the trajectory of the autonomous driving based on the target route set in advance, the map information, the position information on the autonomous driving vehicle 2, the external environment of the autonomous driving vehicle 2, and the travel state of the autonomous driving vehicle 2. The trajectory corresponds to a travel plan of the autonomous driving.

The trajectory includes a path where the vehicle travels by the autonomous driving and a vehicle speed plan by the autonomous driving. The path is a locus that the vehicle in the autonomous driving will travel on the target route. For example, data (steering angle profile) on the change of the steering angle of the autonomous driving vehicle 2 according to the position on the target route can be the path. The position on the target route is, for example, a set longitudinal position set in each predetermined interval (for example, 1 m) in the traveling direction of the target route. The steering angle profile is data in which a target steering angle is associated with each set longitudinal position.

The target route is set based on, for example, the destination, the map information, and the position information on the autonomous driving vehicle 2. The target route may be set in consideration of traffic information such as a traffic congestion. The target route may be set by a well-known navigation system. The destination may be set by the occupant of the autonomous driving vehicle 2 and may be proposed automatically by the autonomous driving ECU 20 or the navigation system.

The trajectory generation unit 40 generates the path on which the autonomous driving vehicle 2 will travel, based on, for example, the target route, the map information, the external environment of the autonomous driving vehicle 2, and the travel state of the autonomous driving vehicle 2. The trajectory generation unit 40 generates the path such that, for example, the autonomous driving vehicle 2 passes through the center of the lane included in the target route (the center in the lane width direction).

The vehicle speed plan is data in which a target vehicle speed is associated with each set longitudinal position, for example. The set longitudinal position may be set based on the traveling time of the autonomous driving vehicle 2 instead of the distance. The set longitudinal position may be set as an arrival position of the vehicle after 1 second or an arrival position of the vehicle after 2 seconds. In this case, the vehicle speed plan can also be expressed as data according to the travel time.

The trajectory generation unit 40 generates the vehicle speed plan based on traffic regulation information such as a legal speed included in the path and map information, for example. Instead of the legal speed, a legal speed set in advance for the position or the section on the map may be used. The trajectory generation unit 40 generates an autonomous driving trajectory from the path and the vehicle speed profile. The method of generating the trajectory by the trajectory generation unit 40 is not limited to the above-described content, and a well-known method regarding the autonomous driving can be adopted. The same applies to the contents of trajectory.

If the remote instruction is requested to the remote instruction server 10 by the remote instruction determination unit 34, or if the autonomous driving vehicle 2 approaches the intersection or the like which is the target of the remote instruction, the trajectory generation unit 40 generates the trajectory corresponding to the remote instruction in advance. The content of the remote instruction is determined in advance according to the situation of the autonomous driving vehicle 2. For example, the content of the remote instruction at the time of turning right at the intersection includes a remote instruction to progress (start to turn right) and a remote instruction to stop (determination pending). The content of the remote instruction at the time of turning right at the intersection may include a remote instruction to go straight without performing the right turn (remote instruction to change the route), or may include the remote instruction to perform the emergency evacuation.

The trajectory generation unit 40 generates a trajectory for the autonomous driving vehicle 2 to turn right at the intersection such that, for example, the autonomous driving vehicle 2 responses to the remote instruction to start the right turn in a situation of turning right at the intersection. The trajectory generation unit 40 may update the trajectory according to the change in the external environment until the remote instruction is received. In addition, if the remote instruction to switch to go straight at the intersection from the right turn at the intersection is present, the trajectory generation unit 40 may generate the trajectory to go straight through the intersection.

If the remote instruction for the emergency evacuation is present, the trajectory generation unit 40 may generate the trajectory for the emergency evacuation in advance. The emergency evacuation trajectory is generated such that the autonomous driving vehicle 2 stops at any of the evacuation spaces set on the map in advance. The trajectory generation unit 40 recognizes the presence or absence of an obstacle at each evacuation space based on the external environment, for example, and generates the trajectory for the emergency evacuation to stop at an empty evacuation space. The trajectory generation unit 40 does not necessarily need to generate the trajectory in advance, and may generate the trajectory in response to the remote instruction after receiving the remote instruction.

The autonomous driving control unit 41 performs the autonomous driving of the autonomous driving vehicle 2. The autonomous driving control unit 41 performs the autonomous driving of the autonomous driving vehicle 2 based on, for example, the external environment of the autonomous driving vehicle 2, the travel state of the autonomous driving vehicle 2, and the trajectory generated by the trajectory generation unit 40. The autonomous driving control unit 41 performs the autonomous driving of the autonomous driving vehicle 2 by transmitting a control signal to the actuator 26.

If the remote instruction is requested to the remote instruction server 10 by the travel situation information transmission unit 39, the autonomous driving control unit 41 waits for the reception of the remote instruction from the remote instruction server 10. If the remote instruction is requested after the autonomous driving vehicle 2 stops, the autonomous driving control unit 41 remains the stopped state until the remote instruction is received.

If the occupant having a driver's license is on board and when the remote instruction is not received even after a waiting time set in advance has elapsed, the autonomous driving control unit 41 may require a determination by the occupant or the manual driving. If the remote instruction is not received even after the waiting time has elapsed, and the determination by the occupant or the manual driving is not possible (a case where the occupant is not on board, or the like), the autonomous driving control unit 41 may perform the emergency evacuation autonomously.

In addition, if an instruction to change the position and posture of the autonomous driving vehicle 2 is issued by the remote commander R after the travel situation information transmission unit 39 transmits the travel situation information to the remote instruction server 10 to request the remote instruction, the autonomous driving control unit 41 changes the position and posture of the autonomous driving vehicle 2 based on the instruction to change the position and posture. Here, the autonomous driving control unit 41 can fix the amount of change (amount of change in the posture (direction and position) of autonomous driving vehicle 2) per one instruction to change the position and posture of the autonomous driving vehicle 2. In this case, the remote commander R performs instruction to change the position and posture of the autonomous driving vehicle 2 multiple times until the desired area is included in the detection area. In this way, even if the change instruction is delayed or interrupted, it is possible to appropriately change the position and posture of the autonomous driving vehicle 2 while suppressing the position and posture of the autonomous driving vehicle 2 from becoming unintended state. After the instruction to change the position and posture of the autonomous driving vehicle 2 is issued, the travel situation information transmission unit 39 transmits the changed travel situation information to the remote instruction server 10.

Configuration of Remote Instruction Apparatus

Hereinafter, a configuration of the remote instruction apparatus 1 according to the present embodiment will be described with reference to the drawings. As illustrated in FIG. 1, the remote instruction apparatus 1 includes a remote instruction server 10, and a commander interface 3.

Figure 8:
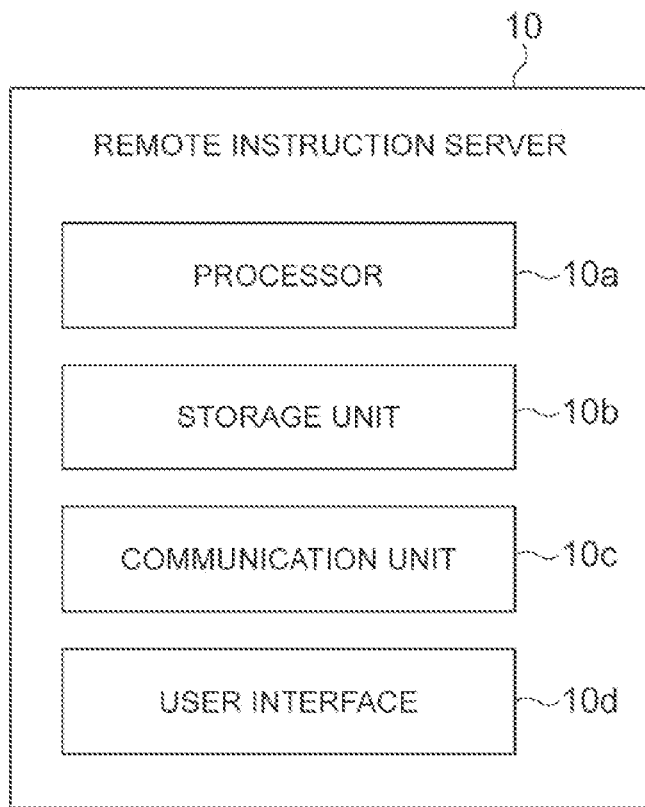
FIG. 8 is a block diagram illustrating an example of a hardware configuration of a remote instruction server.

First, a hardware configuration of the remote instruction server 10 will be described. FIG. 8 is a block diagram illustrating an example of the hardware configuration of the remote instruction server 10. As illustrated in FIG. 8, the remote instruction server 10 is configured as a general computer including a processor 10a, a storage unit 10b, a communication unit 10c, and a user interface 10d. The user in this case means a user (administrator or the like) of the remote instruction server 10.

The processor 10a controls the remote instruction server 10 by operating various operating systems. The processor 10a is an arithmetic unit such as a central processing unit (CPU) including a control device, an arithmetic device, a register, and the like. The processor 10a performs overall management of the storage unit 10b, the communication unit 10c, and the user interface 10d. The storage unit 10b is configured to include at least one of a memory and a storage. The memory is a recording medium such as a ROM and a RAM. The storage is a recording medium such as a hard disk drive (HDD).

The communication unit 10c is a communication device for performing communication via the network N. A network device, a network controller, a network card, and the like can be used as the communication unit 10c. The user interface 10d is an input output unit of the remote instruction server 10 to and from the user such as an administrator. The user interface 10d includes output devices such as a display and a speaker, and an input device such as a touch panel. The remote instruction server 10 does not necessarily need to be provided in the facility, and may be mounted on a moving body such as a vehicle.

Figure 9:
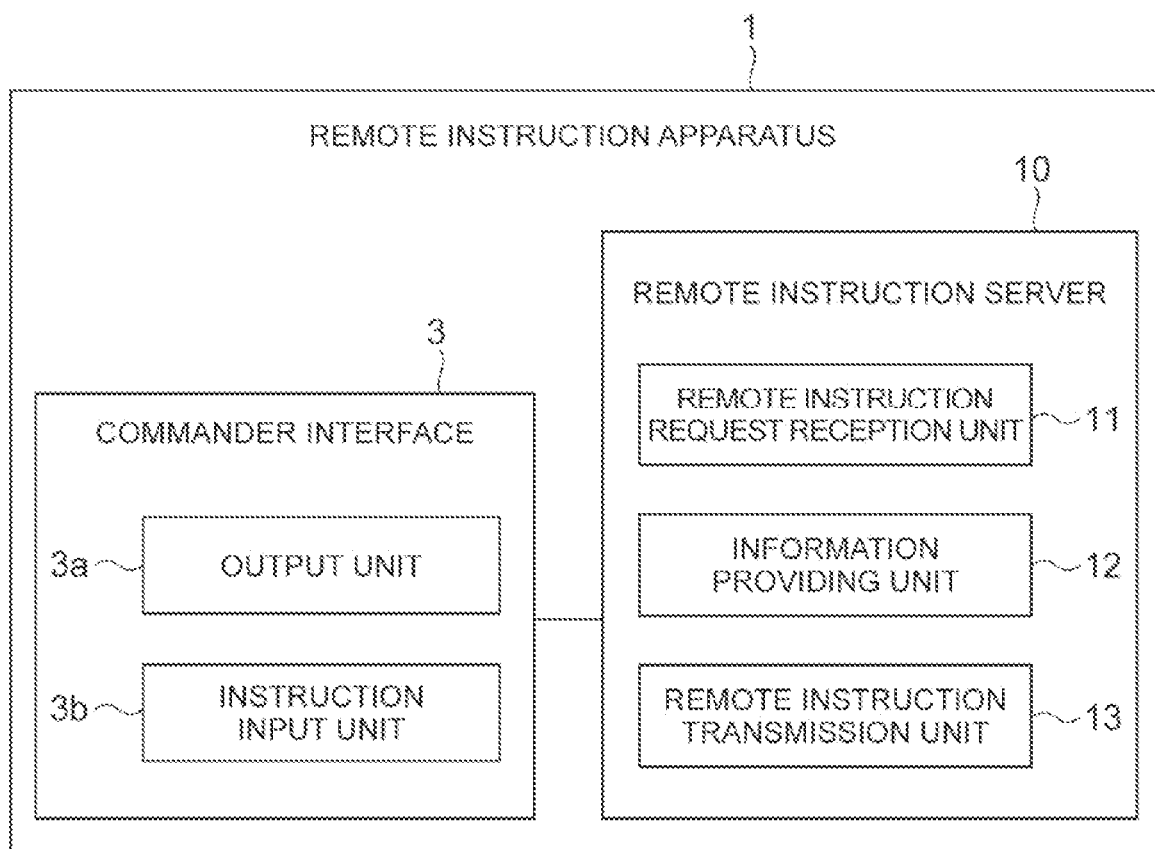
FIG. 9 is a block diagram illustrating an example of a configuration of a remote instruction apparatus.

FIG. 9 is a block diagram illustrating an example of the configuration of the remote instruction apparatus 1. As illustrated in FIG. 9, the commander interface 3 is an input output unit of the remote instruction apparatus 1 to and from the remote commander R. The commander interface 3 includes an output unit 3a and an instruction input unit 3b.

The output unit 3a is a device that outputs information used for the remote instruction of the autonomous driving vehicle 2 to the remote commander R. The output unit 3a includes a display that outputs image information and a speaker that outputs sound information.

For example, an image (an image of a scenery ahead) in the front direction of the autonomous driving vehicle 2 captured by the camera of the autonomous driving vehicle 2 is displayed on the display. The display may have a plurality of display screens, and images of the side and/or rear direction of the autonomous driving vehicle 2 may be displayed. The display is not particularly limited as long as the display can provide visual information to the remote commander R. The display may be a wearable device mounted to cover the eyes of the remote commander R.

The speaker is a headset speaker mounted to ahead of the remote commander R, for example. For example, the speaker informs the remote commander R of the situation of the autonomous driving vehicle 2 (for example, the situation such as a right turn at the intersection) by the voice. The speaker does not necessarily need to be a headset, and may be a stationary type.

The output unit 3a may provide the information to the remote commander R by vibration. The output unit 3a may include, for example, a vibration actuator provided on a seat of the remote commander R. The output unit 3a may alert the remote commander R about the approach of another vehicle to the autonomous driving vehicle 2 by the vibration. The output unit 3a may include the vibration actuators on the left and right sides of the seat, and may vibrate the vibration actuators at the positions corresponding to the approaching direction of other vehicles. The output unit 3a may include a wearable vibration actuator that is mounted to a body of the remote commander R. The output unit 3a can provide the information to the remote commander R by vibrating the vibration actuator mounted at each position of the body in accordance with the approaching direction of the other vehicles.

Figure 10:
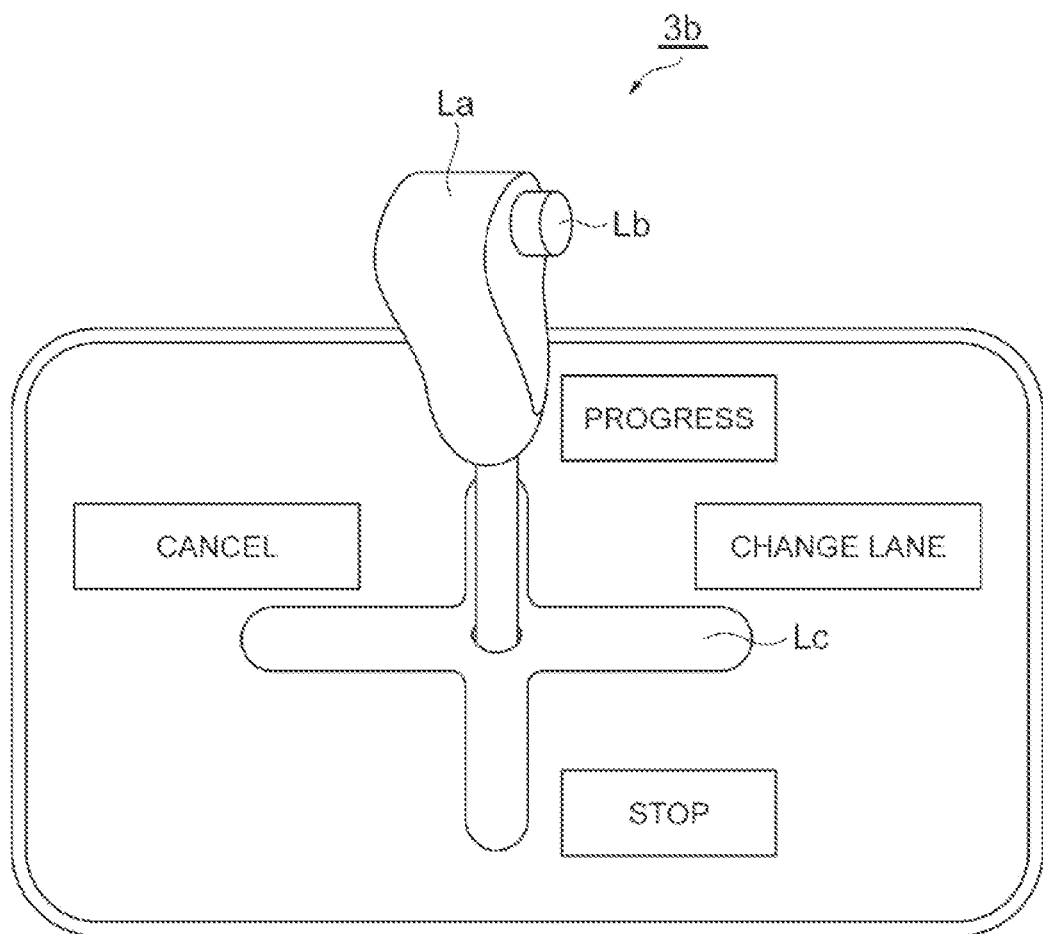
FIG. 10 is a diagram illustrating an example of an instruction input unit.

The instruction input unit 3b is a device to which the remote instruction is input from the remote commander R. Here, FIG. 10 is a diagram illustrating an example of the instruction input unit 3b. In the instruction input unit 3b illustrated in FIG. 10, a gate type lever structure is adopted. In FIG. 10, a lever La, a monitoring start button Lb, and a cross groove Lc are illustrated.

The lever La is a lever operated by the remote commander R. The lever La includes, for example, a grip portion at the upper end and a shaft portion extending from the grip portion toward the cross groove (cross gate) Lc. The monitoring start button Lb is provided on a side surface of the grip portion of the lever La. The position of the monitoring start button Lb is not particularly limited, and may be the left side surface or the right side surface of the grip portion. The monitoring start button Lb may be provided on the same surface as the cross groove Lc.

The monitoring start button Lb is a button pressed when the remote commander R starts monitoring the situation of the autonomous driving vehicle 2. The remote instruction apparatus 1 may recognize that the remote commander R starts monitoring by the monitoring start button Lb being pressed. The monitoring start button Lb also functions as an unlock button for the lever La. That is, the lever La can be unlocked and can be moved while the monitoring start button Lb is pressed or during a certain time period after the monitoring start button Lb is pressed. The monitoring start button Lb does not necessarily need to be provided.

The cross groove Lc is a groove in which the shaft portion of the lever La enters and the lever La moves by the operation of the remote commander R. In the instruction input unit 3b illustrated in FIG. 10, the remote instruction is input by switching the position of the lever La along the cross groove Lc. As illustrated in FIG. 10, as an example, an input of an instruction of "progress" can be input to the upward direction of the cross groove Lc, "stop" to the downward direction, "lane change" to the right direction, and "cancel" to the left direction.

The remote commander R inputs the remote instruction of "progress" to the autonomous driving vehicle 2 by, for example, moving the lever La upward direction while pressing the monitoring start button Lb. The remote commander R inputs the remote instruction of "stop" to the autonomous driving vehicle 2 by, for example, moving the lever La downward direction while pressing the monitoring start button Lb. When the remote commander R wants to cancel the immediately previous remote instruction, the instruction of "cancel" is input by moving the lever La to the left direction while pressing the monitoring start button Lb.

The display such as "progress" in the cross groove Lc may be a digital display that can be changed. The display such as "progress" and "lane change" may be changed according to the remote instructions situation of the autonomous driving vehicle 2. For example, "lane change" may be displayed as "overtaking" according to the situation. In this case, the remote instruction to overtake the autonomous driving vehicle 2 can be issued by moving the lever La to the right.

The remote instruction of "stop" may be that of "determination pending". In a case of "stop", the vehicle stops regardless of the position of the autonomous driving vehicle 2, but in a case of "determination pending", the autonomous driving is continued to a position where the remote instruction is necessary (for example, a stop line in front of a traffic light). The instruction input unit 3b may be able to input "stop" and "determination pending" separately. When the monitoring start button Lb is present, by continuing to press the monitoring start button Lb, the remote commander R may handle the pressing as the instruction of "determination pending".

In addition, instead of the cross groove, a straight-shaped groove that can select two remote instruction inputs of progress and stop (or pending) may be adopted, or a step-shape groove used for a shift lever of a vehicle or the like may be adopted. In addition, a button for the emergency evacuation may be separately provided. The emergency evacuation may be one of the remote instructions that can be selected by operating the lever La.

In addition, various input methods can be adopted for the instruction input unit 3b. A button and a touch panel may be adopted for the instruction input unit 3b, or various switches such as a toggle switches and a rocker switch may also be adopted. A keyboard may be adopted for the instruction input unit 3b, or a voice input device may also be adopted. A button cover may be attached to the instruction input unit 3b in order to prevent erroneous operation. In the instruction input unit 3b, a button and a switch may be used together, a button and a handle may be used together, or a pedal and a lever may be used together in order to prevent erroneous operation. In the instruction input unit 3b, the remote instruction may be input by combining two or more of the lever operation, the button operation, the touch panel operation, the pedal operation, and the voice input.

In a case of a virtual button such as a touch panel, it may be possible to prevent the remote commander R from operating reflexively without fully understanding the situation of the autonomous driving vehicle 2 by not fixing the display position of the button. The content (progress, stop, or the like) of the remote instruction input by the remote commander R may be notified by a voice and/or an image display. The image display may be notified to the remote commander R by a text display, or may be notified by a color change.

An enable button may be adopted for the instruction input unit 3b. The enable button in this case is a button that does not transmit a signal unless a pressing amount is with a set pressing amount range, and if the pressing amount is too small or too large, the signal is not transmitted. A two-stage switch that can change the information transmitted in a lightly pressed state and in deeply pressed state may be adopted for the instruction input unit 3b. A dial (for example, a rotary switch) that selects the remote instruction content by rotating a disk-shaped rotary disk may be adopted for the instruction input unit 3b. The dial is provided with a plurality of steps, and each step corresponds to the remote instruction contents such as "progress" and "stop".

Next, a functional configuration of the remote instruction server 10 will be described. As illustrated in FIG. 9, the remote instruction server 10 includes a remote instruction request reception unit 11, an information providing unit 12, and a remote instruction transmission unit 13.

The remote instruction request reception unit 11 receives a remote instruction request when the autonomous driving vehicle 2 requests the remote instruction server 10 for the remote instruction. In addition, the remote instruction request reception unit 11 acquires the travel situation information on the autonomous driving vehicle 2 that has requested for the remote instruction, by the transmission from the autonomous driving vehicle 2. The remote instruction request reception unit 11 may acquire the travel situation information on the autonomous driving vehicle 2 which does not request for the remote instruction.

The information providing unit 12 provides various types of information to the remote commander R. If the remote instruction request reception unit 11 receives the remote instruction request, the information providing unit 12 requests the responsible remote commander R via the commander interface 3 to input the remote instruction In addition, the information providing unit 12 provides information on the autonomous driving vehicle 2 to the remote commander R based on the travel situation information on the autonomous driving vehicle 2 acquired by the remote instruction request reception unit 11. For example, the information providing unit 12 displays an image in the front direction of the autonomous driving vehicle 2 on the display of the output unit 3a of the commander interface 3. The information providing unit 12 may display an image viewed from the vicinity of the driver's seat of the autonomous driving vehicle 2 by viewpoint conversion. The information providing unit 12 may display the side image and rear image of the autonomous driving vehicle 2. The information providing unit 12 may display a panoramic image that is a composite image of the images in which the surroundings of the autonomous driving vehicle 2 are captured, or may display an overhead image generated to look down the autonomous driving vehicle 2 by the image composition and the viewpoint conversion. The information providing unit 12 may perform highlight display of an object in the image (for example, marking that surrounds another vehicle or the like with a frame). If a traffic signal is included in the image, the information providing unit 12 may display a result of recognizing the lighting state of the traffic signal on the display.

The information providing unit 12 may display various information on the display, not limited to the camera image captured by the camera of the autonomous driving vehicle 2. The information providing unit 12 may display the situation of the autonomous driving vehicle 2 which requested for the remote instruction (the situation at the time of the right turn at the intersection, the situation avoiding the obstacle by the offset avoidance, or the like) using texts or icons. The information providing unit 12 may display a type of remote instruction (progressive traveling, waiting, and the like) that can be selected by the remote commander R, on the display. The information providing unit 12 may display the information (a locus on which the autonomous driving vehicle 2 performs progressing corresponding to the remote instruction to perform the progressing) relating to the trajectory of the autonomous driving vehicle 2 in accordance with the remote instruction, on the display.

The information providing unit 12 may display the information on an object detected by the radar sensor of the autonomous driving vehicle 2. The information on the object may be displayed as an icon in the overhead image. When the types of the objects are identified, the icons may be displayed according to the types of the objects. The information providing unit 12 may display the map information on the surroundings of the autonomous driving vehicle 2 acquired based on the position information on the autonomous driving vehicle 2, on the display. The map information may be included in the remote instruction server 10 or may be acquired from another server or the like. The map information on the surroundings of the autonomous driving vehicle 2 may be acquired from the autonomous driving vehicle 2.

The information providing unit 12 may display road traffic information acquired based on the position information on the autonomous driving vehicle 2, on the display. The road traffic information includes at least one of information on a traffic congestion occurring section or a construction section information, information on an accident position, and the like. The road traffic information can be acquired from, for example, a traffic information center.

The information providing unit 12 may display information on the vehicle speed of the autonomous driving vehicle 2 on the display, and may display information on the steering angle of the autonomous driving vehicle 2 on the display. The information providing unit 12 may display information on a slope of the road where the autonomous driving vehicle 2 is positioned, on the display. If the autonomous driving vehicle 2 has a vehicle interior camera, the information providing unit 12 may display an image of the vehicle interior of the autonomous driving vehicle 2 as necessary. The information providing unit 12 may display a occupant's boarding situation and/or luggage loading situation in the autonomous driving vehicle 2, on a display.

The information providing unit 12 provides the sound information to the remote commander R through the speaker of the output unit 3a of the commander interface 3. The information providing unit 12 may output the situation (at the time of right turn at the intersection, at the time of avoiding the obstacle by the offset avoidance, or the like) of the autonomous driving vehicle 2, from the speaker as the voice. The information providing unit 12 may output the approach of another vehicle or the like around the autonomous driving vehicle 2, as the sound or the voice from the speaker. The information providing unit 12 may directly output the sound (noise) around the autonomous driving vehicle 2, from the speaker. The information providing unit 12 may output an occupant's voice in the vehicle, from the speaker as necessary. In some embodiments, the information may not be provided through the speaker.

In addition, if the output unit 3a includes the vibration actuator, the information providing unit 12 may provide the information to the remote commander R by the vibration. In this case, the information providing unit 12 can provide the information to the remote commander R (alert) by, for example, vibrating the vibration actuator at a position corresponding to the direction to which attention should be paid, such as the approaching direction of another vehicle to the autonomous driving vehicle 2 or the direction where a pedestrian is present.

As described above, the range of the detection information by the external sensor 22 included in the travel situation information is set as the limited information range based on the external situation. In this case, the information providing unit 12 provides the remote commander R with the information on the autonomous driving vehicle 2 based on the travel situation information including detection information set as the limited information range. As described above, even if the detection information range of the external sensor 22 is set as the limited information range, the detection information that includes the area to be confirmed based on the external situation in the detection area is included. Therefore, the remote commander R can determine the remote instruction based on the travel situation information that includes the detection information set as the limited information range.

In addition, the information providing unit 12 notifies the remote commander R of the fact that the necessary information is not included in the detection information within the limited information range, based on the instruction from the notification and proposal unit 37 using the output unit 3a of commander interface 3. Alternatively, the information providing unit 12 presents to the remote commander R the content of a proposal for a change in the position and posture of the autonomous driving vehicle 2 or a change in the detection area of the external sensor 22 based on the instruction from the notification and proposal unit 37 using the output unit 3a of commander interface 3.

If the remote commander R inputs the remote instruction to the instruction input unit 3b of the commander interface 3, the remote instruction transmission unit 13 transmits the input remote instruction to the autonomous driving vehicle 2. If the remote instruction input by the remote commander R is transmitted to the autonomous driving vehicle 2, the information providing unit 12 may continuously transmit the information on the autonomous driving vehicle 2 to the remote commander R, or may switch the information to information on another autonomous driving vehicle 2 that requests for the remote instruction.

In addition, if the remote commander R performs an instruction to change the position and posture of the autonomous driving vehicle 2 or the instruction to change the detection area of the external sensor 22 to the output unit 3a of the commander interface 3, the remote instruction transmission unit 13 transmits the input change instruction to the autonomous driving vehicle 2. The remote commander R can perform an instruction to change the position and posture of the autonomous driving vehicle 2 based on the information of the fact that the necessary information is not included in the detection information within the limited information range, which is performed by the information providing unit 12 using the output unit 3a. Alternatively, the remote commander R can perform an instruction to change the position and posture of the autonomous driving vehicle 2 based on the content of the proposal such as the change of the position and posture of the autonomous driving vehicle 2, which is proposed by the information providing unit 12 using the output unit 3a. In addition, if the information provided based on the travel situation information on the autonomous driving vehicle 2 is checked and it is determined that the necessary information is not included, the remote commander R may perform an instruction to change the position and posture of the autonomous driving vehicle 2, and the like.

Flow of Processing when Remote Instruction Required Situation Occurs

Next, a flow of processing performed by the autonomous driving ECU 20 of the autonomous driving vehicle 2 when a remote instruction required situation occurs will be described with reference to a flowchart of FIG. 11. The processing illustrated in FIG. 11 is started when it is determined by the remote instruction determination unit 34 that a remote instruction required situation occurs, in which the remote instruction should be requested.

Figure 11:
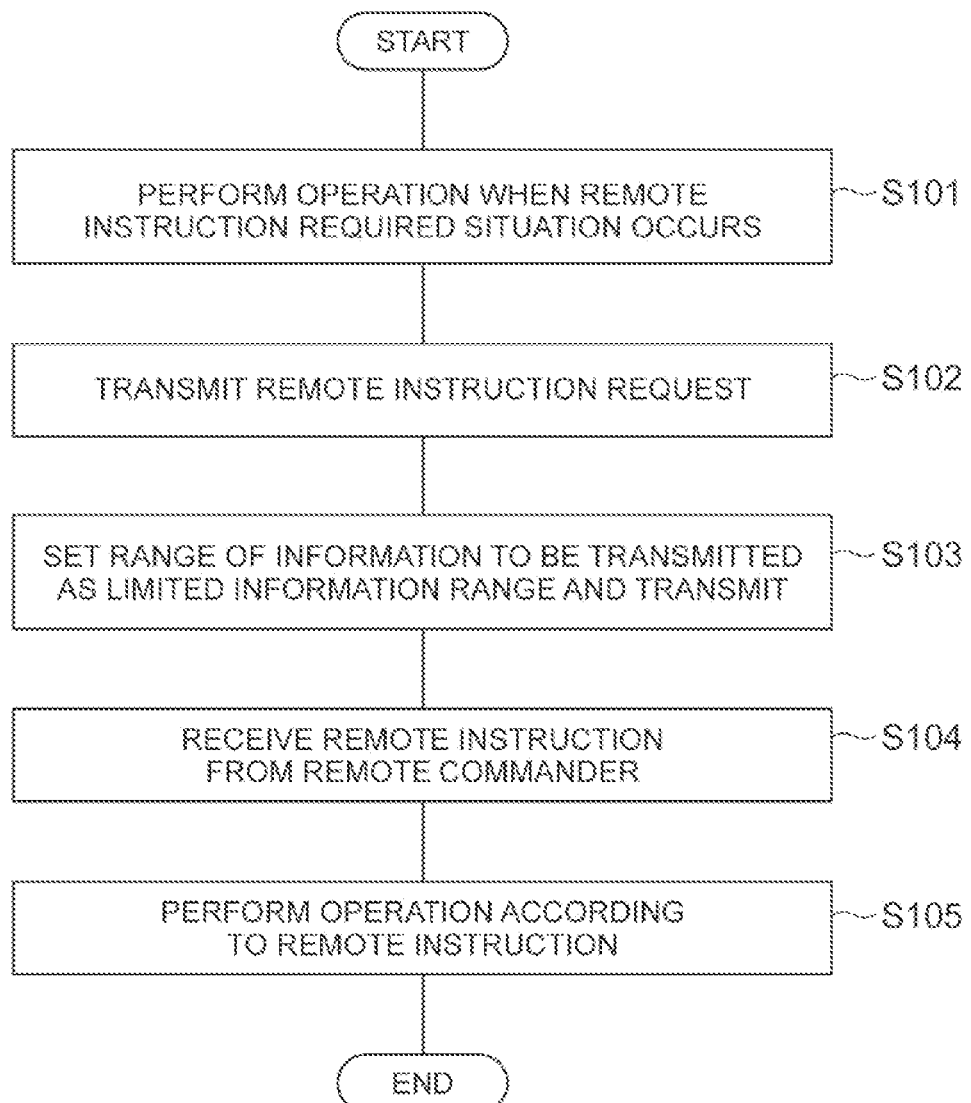
FIG. 11 is a flowchart illustrating a flow of processing performed by an autonomous driving ECU when a remote instruction required situation occurs.

As illustrated in FIG. 11, it is determined by the remote instruction determination unit 34 that the remote instruction required situation occurs, the autonomous driving ECU 20 performs an operation when a remote instruction required situation occurs (S101). In the present embodiment, as an example, when the remote instruction required situation occurs, the autonomous driving ECU 20 stops the autonomous driving vehicle 2 at a position corresponding to the remote instruction required situation. If the remote instruction required situation is a situation of entering the intersection, the autonomous driving ECU 20 may stop the autonomous driving vehicle 2 at the position of the stop line provided in the intersection, or if the remote instruction required situation is a situation in which a stopped vehicle is detected ahead, the autonomous driving ECU 20 may stop the autonomous driving vehicle 2 at a position before a predetermined distance from the stopped vehicle.

Next, the remote instruction determination unit 34 transmits the remote instruction request to the remote commander R (remote instruction server 10) (S102). The transmission information limitation unit 35 sets the range of information to be transmitted to the remote commander R among the detection information detected by the external sensor 22 as the limited information range. Then, the travel situation information transmission unit 39 transmits the travel situation information on the autonomous driving vehicle 2 including the detection information of which the information range is set as the limited information range to the remote instruction server 10 (S103).

When the remote instruction request is performed from the autonomous driving vehicle 2, the remote commander R issues the remote instruction to the autonomous driving vehicle 2 based on the travel situation of the autonomous driving vehicle 2 transmitted from the travel situation information transmission unit 39. When the remote instruction from the remote commander R is received (S104), the autonomous driving control unit 41 performs an operation according to the remote instruction (for example, start to enter the intersection, start to turn right, or the like) (S105).

Hereinafter, specific examples of respective steps performed by the autonomous driving vehicle 2 and the remote commander R when various remote instruction required situations occur, will be described.

(Turning Right at Intersection)

As an example, a case where the autonomous driving vehicle 2 turns right at the intersection as illustrated in FIG. 3 will be described.

(Step A1)

The remote instruction determination unit 34 recognizes that the autonomous driving vehicle 2 reaches the intersection where the vehicle turns right (the vehicle is in the remote instruction required situation) based on the position information on the autonomous driving vehicle 2, the map information in the map database 24, and the trajectory generated by the trajectory generation unit 40.

(Step A2)

The autonomous driving ECU 20 stops the autonomous driving vehicle 2 at a predetermined stop position. The stop position here may be a position of a stop line drawn on the road surface, or may be a position set in advance other than the stop line.

(Step A3)

The remote instruction determination unit 34 requests the remote instruction by the remote commander R.

(Step A4)

As described above, when turning at the intersection, as an example, when issuing the remote the remote instruction, the remote commander R needs to confirm that both a vehicle going straight on the oncoming lane and a pedestrian crossing the road that is the destination of the right turn are not present. Therefore, as an example, the transmission information limitation unit 35 selects a sensor of which the detection area includes the front direction of the autonomous driving vehicle 2 and a sensor of which the detection area includes the right front direction of the vehicle, from the sensors included in the external sensor 22, and sets only the detection information detected by the selected sensor as the detection information within the limited information range. That is, the transmission information limitation unit 35 can set the range of information to be transmitted to the remote commander R among the detection information detected by the external sensor 22 as the limited information range based on the map information and the trajectory.

Here, the transmission information limitation unit 35 may select any type of sensor from the sensors such as a camera, a radar, or a LIDAR exemplified as a sensor included in the external sensor 22. Then, the travel situation information transmission unit 39 transmits the travel situation information of the autonomous driving vehicle 2 including the detection information of which the information range is set as the limited information range, to the remote instruction server 10.

Here, in step A4, the transmission information limitation unit 35 may further set a limited information range based on the result of recognition performed by the external environment recognition unit 32. Specifically, for example, the setting of the limited information range may be performed based on the presence or absence of the oncoming vehicle X waiting for the right turn. Here, as described above, as an example, when the oncoming vehicle X waiting for the right turn is not recognized in the front direction of the autonomous driving vehicle 2 by the external environment recognition unit 32, the transmission information limitation unit 35 may set only the detection information by the sensor of which the detection area is right front direction of the vehicle without including the detection information by the sensor of which the detection area is the front direction of the vehicle as the limited information range, among the plurality of sensors of the external sensor 22, as the detection information within the limited information range. In addition, is the case illustrated in FIG. 3, if a pedestrian trying to cross the road that is the destination of the right turn is not recognized by the external environment recognition unit 32, the transmission information limitation unit 35 may not include the detection information by the sensor of which the detection area right front direction of the vehicle, as the detection information within the limited information range.

(Step A5)

The remote commander R checks the travel situation information transmitted from the autonomous driving vehicle 2 and issues the remote instruction.

(Step A6)

When receiving the remote instruction from the remote commander R, the autonomous driving control unit 41 starts the right turn.

(Turn Right at Intersection: Angle of View Changed)

Figure 12A:
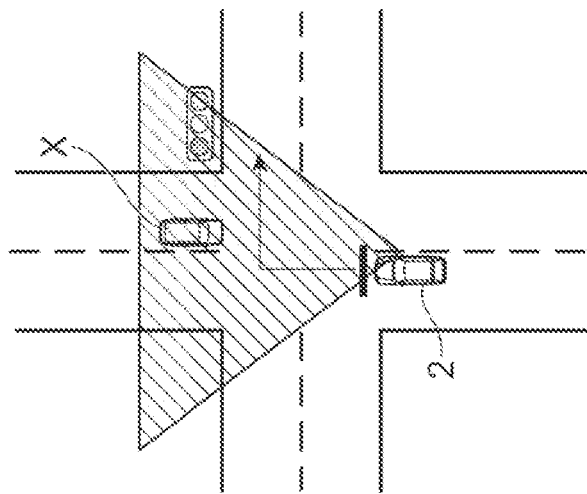
FIG. 12A is a schematic diagram illustrating setting of the limited information range when the autonomous driving vehicle turns right at an intersection.

As an example, as illustrated in FIG. 12A, a case when the autonomous driving vehicle 2 turns right at the intersection, and further the case where the position and posture of the autonomous driving vehicle 2 is changed or the detection area of the external sensor 22 is changed will be described.

(Step B1)

Similarly to the step A1, the remote instruction determination unit 34 recognizes the arrival of the autonomous driving vehicle 2 at the intersection turning right, (the vehicle is in the remote instruction required situation).

(Step B2)

Similarly to the step A2 described above, the autonomous driving ECU 20 stops the autonomous driving vehicle 2 at a predetermined stop position.

(Step B3)

The remote instruction determination unit 34 requests the remote instruction by the remote commander R.

(Step B4)

Similarly to the step A4 described above, the transmission information limitation unit 35 sets the range of information to be transmitted to the remote commander R as the limited information range. Then, the travel situation information transmission unit 39 transmits the travel situation information of the autonomous driving vehicle 2 including the detection information of which the information range is set as the limited information range, to the remote instruction server 10. Here, the transmission information limitation unit 35 sets only the detection information by the sensor of which the detection area includes the front of the autonomous driving vehicle 2, as the detection information within the limited information range. However, similarly to the step A4 described above, the detection information by the sensor of which detection area includes the right front direction of the vehicle may be included as the detection information within the limited information range such that the pedestrian crossing the road that is the destination of the right turn can be checked.

(Step B5)

The remote commander R checks the detection information within the limited information range included in the travel situation information received from the autonomous driving vehicle 2, and if the desired information such as necessary information is not included, then, performs at least one of the instruction to change the position and posture of the autonomous driving vehicle 2 and the instruction to change the detection area of the external sensor 22.

If a notification of a fact that the necessary information is not included in the detection information within the limited information range is performed via the commander interface 3 of the remote instruction apparatus 1, the remote commander R may issues the instruction to change the position and posture of the autonomous driving vehicle 2 based on this notification. In addition, If the change of the position and posture of the autonomous driving vehicle 2 or the change of the detection area of the external sensor 22 is proposed via the commander interface 3 of the remote instruction apparatus 1, the remote commander R may issues the instruction to change the position and posture of the autonomous driving vehicle 2 based on the proposal. If the notification and the proposal is not performed, the remote commander R may issues the instruction to change the position and posture of the autonomous driving vehicle 2 based on the result of checking the travel situation information. The necessary information here may be, for example, an oncoming straight lane positioned on the rear side of the oncoming vehicle X waiting for the right turn that is present in the front direction of the autonomous driving vehicle 2, or a pedestrian crossing at the destination of right turn.

(Step B6)

Figure 12B:
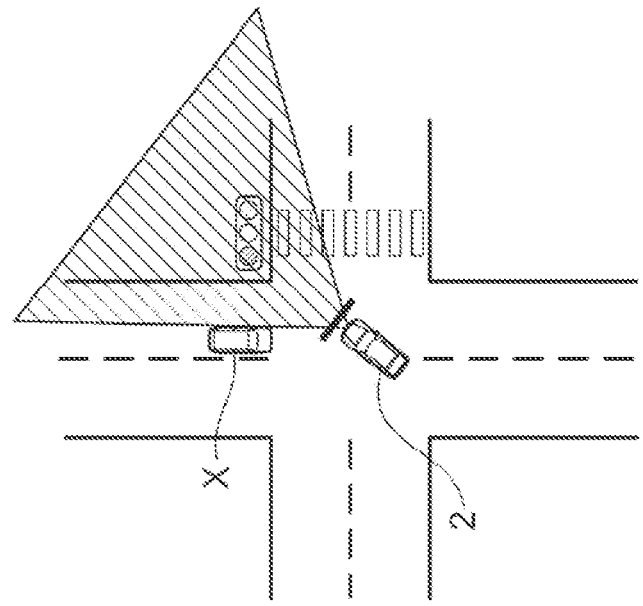
FIG. 12B is a schematic diagram illustrating a change in the detection area when the position and posture of the autonomous driving vehicle is changed.

When the instruction to change the position and posture of autonomous driving vehicle 2 is issued by the remote commander R, the autonomous driving control unit 41 changes the position and posture of the autonomous driving vehicle 2 based on the instruction to change the position and posture. Here, for example, as illustrated in FIG. 12B, the remote commander R causes the autonomous driving vehicle 2 to steer to the right direction while progressing forward from the current position, and to stop such that the oncoming straight lane (necessary information) positioned on the rear side of the oncoming vehicle X waiting for the right turn that is present in front of autonomous driving vehicle 2 can be detected without being shielded by the oncoming vehicle X.

Figure 12C:
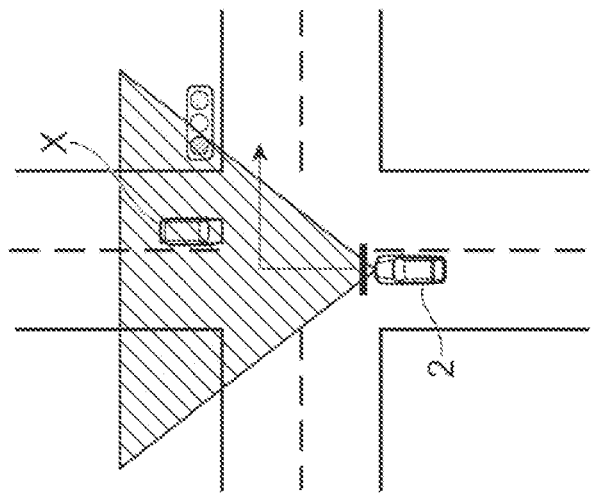
FIG. 12C is a schematic diagram illustrating a change in the detection area when the detection area of the external sensor is changed.

When the instruction to change the detection area of the external sensor 22 is issued by the remote commander R, the sensor angle of view change unit 38 changes the detection area of the external sensor 22 based on the instruction to change the detection area. Here, for example, as illustrated in FIG. 12C, the remote commander R translates the position of the sensor of which the detection area is the front of the autonomous driving vehicle 2 to the position on the right side of the autonomous driving vehicle 2, such that the oncoming straight lane (necessary information) positioned on the rear side of the oncoming vehicle X waiting for the right turn that is present in front of autonomous driving vehicle 2 can be detected as much as possible without being shielded by the oncoming vehicle X. In this way, it is possible to easily detect the oncoming straight lane adjacent to the oncoming right turn lane in which the oncoming vehicle X is present, by the sensor that detects the front direction of the autonomous driving vehicle 2.

(Step B7)

The remote commander R checks the travel situation information transmitted from the autonomous driving vehicle 2 and issues the remote instruction.

(Step B8)

When receiving the remote instruction from the remote commander R, the autonomous driving control unit 41 starts the right turn.

(Left Turn at Intersection)

Figure 13:
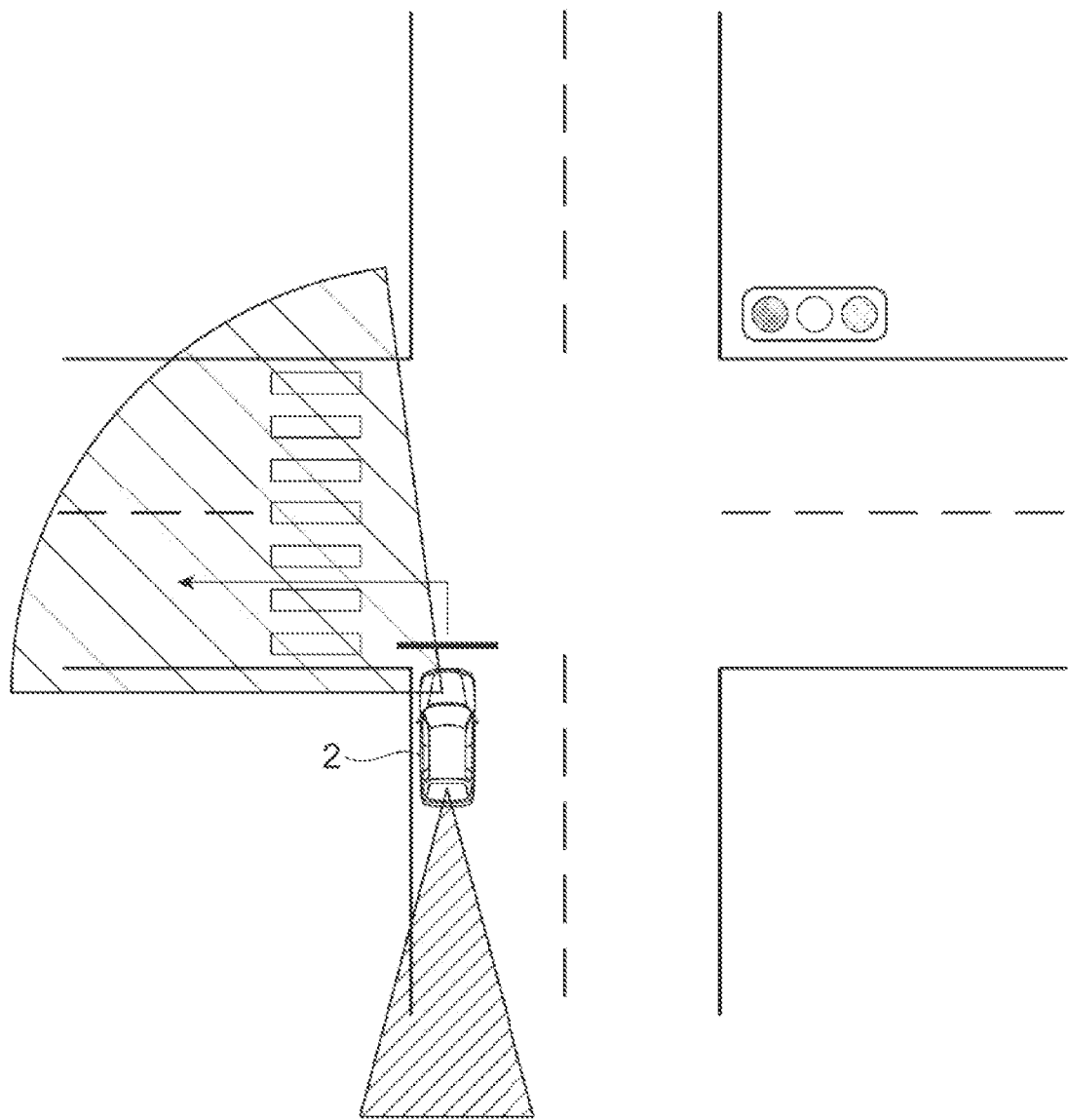
FIG. 13 is a schematic diagram illustrating setting of the limited information range when the autonomous driving vehicle turns left at an intersection.

As an example, a case where the autonomous driving vehicle 2 turns left at the intersection as illustrated in FIG. 13 will be described.

(Step C1)

The remote instruction determination unit 34 recognizes that the autonomous driving vehicle 2 reaches the intersection where the left turn is to be performed (that is, a remote instruction required situation), similarly to step A1.

(Step C2)

Similarly to the step A2 described above, the autonomous driving ECU 20 stops the autonomous driving vehicle 2 at a predetermined stop position.

(Step C3)

The remote instruction determination unit 34 requests the remote instruction by the remote commander R.

(Step C4)

When turning left at the intersection, as an example, when issuing the remote the remote instruction, the remote commander R needs to confirm that both a pedestrian crossing the road that is destination of the left turn and a motorcycle approaching from behind that may cause a fear of interruption when turning left. Therefore, as an example, the transmission information limitation unit 35 selects a sensor of which the detection area includes the left side of the autonomous driving vehicle 2 and a sensor of which the detection area includes the rear side, from the sensors included in the external sensor 22, and sets only the detection information detected by the selected sensor, as the detection information within the limited information range. That is, the transmission information limitation unit 35 can set the range of information to be transmitted to the remote commander R among the detection information detected by the external sensor 22 as the limited information range based on the map information and the trajectory.

Here, the transmission information limitation unit 35 may select any type of sensor from the sensors such as a camera, a radar, or a LIDAR exemplified as a sensor included in the external sensor 22. Then, the travel situation information transmission unit 39 transmits the travel situation information of the autonomous driving vehicle 2 including the detection information of which the information range is set as the limited information range, to the remote instruction server 10.

Here, in step C4, the transmission information limitation unit 35 may further set a limited information range based on the result of recognition performed by the external environment recognition unit 32. Specifically, for example, the limited information range may be set based on the presence or absence of a following vehicle of the autonomous driving vehicle 2 (another vehicle behind the autonomous driving vehicle 2). Here, for example, if a following vehicle is present behind the autonomous driving vehicle 2, when the rear direction of the autonomous driving vehicle 2 is detected by the external sensor 22, an area that is shielded by the following vehicle is generated. As a result, the recognition accuracy of a motorcycle, a bicycle, or the like that passes through the left side of the autonomous driving vehicle 2 from behind decreases. In such a case, the autonomous driving vehicle 2 may travel based on the remote instruction from the remote commander R. However, if a following vehicle is not present behind the autonomous driving vehicle 2, the autonomous driving vehicle 2 can autonomously perform the left turn by autonomous driving by checking the rear direction. Therefore, as an example, when a following vehicle is not recognized behind the autonomous driving vehicle 2 by the external environment recognition unit 32, among the plurality of sensors included in the external sensor 22, the transmission information limitation unit 35 may set only the detection information by the sensor of which the detection area is the left side as the detection information within the limited information range, without including the detection information by the sensor of which the detection area is the rear side as the limited information range.

Similarly, in the case illustrated in FIG. 13, if a pedestrian trying to cross the road that is the destination of the left turn is not recognized by the external environment recognition unit 32, the transmission information limitation unit 35 may not include the detection information by the sensor of which the detection area is the left side as the detection information within the limited information range.

In the example illustrated in FIG. 13, as an example, the transmission information limitation unit 35 sets the detection information on the left and rear side as the detection information within the limited information range, but may further include the detection information by the sensor of which the detection area is the front direction of the autonomous driving vehicle 2, in the detection information within the limited information range.

(Step C5)

The remote commander R checks the travel situation information transmitted from the autonomous driving vehicle 2 and issues the remote instruction.

(Step C6)

When receiving the remote instruction from the remote commander R, the autonomous driving control unit 41 starts to turn left.

(Going Straight at Intersection with Traffic Signal)

As an example, a case where the autonomous driving vehicle 2 goes straight through an intersection where a traffic signal is installed as illustrated in FIG. 5 will be described.

(Step D1)

Similarly to step A1, the remote instruction determination unit 34 recognizes that the autonomous driving vehicle 2 reaches the intersection where vehicle goes straight (that is, the remote instruction required situation).

(Step D2)

Similarly to the step A2 described above, the autonomous driving ECU 20 stops the autonomous driving vehicle 2 at a predetermined stop position.

(Step D3)

The remote instruction determination unit 34 requests the remote instruction by the remote commander R.

(Step D4)

If the autonomous driving vehicle 2 goes straight through the intersection where the traffic signal is installed as described above, for example, the remote commander R needs to check the information on the lighting of the traffic signal when issuing the remote the remote instruction. Therefore, as an example, the transmission information limitation unit 35 selects a sensor of which the detection area includes the traffic signal from the plurality of sensors included in the external sensor 22. Here, the transmission information limitation unit 35 selects a camera as the sensor as described above. Then, the transmission information limitation unit 35 extracts a portion including the light projection unit S of the traffic signal from the image (detection information) captured by the selected camera, and sets the extracted image A as the detection information within the limited information range.

That is, the transmission information limitation unit 35 can set the range of information to be transmitted to the remote commander R among the detection information detected by the external sensor 22 as the limited information range based on the map information and the trajectory. Then, the travel situation information transmission unit 39 transmits the travel situation information of the autonomous driving vehicle 2 including the detection information of which the information range is set as the limited information range, to the remote instruction server 10.

The transmission information limitation unit 35 selects only an image (detection information) captured by the camera capable of identifying a color among the cameras, radars, and riders of which the detection area is in the front direction of the autonomous driving vehicle 2, instead of extracting only the portion including the light projection unit S from the image captured by the camera. Then, the transmission information limitation unit 35 may set the image captured by the selected camera as the detection information within the limited information range.

(Step D5)

The remote commander R checks the travel situation information transmitted from the autonomous driving vehicle 2 and issues the remote instruction.

(Step D6)

When receiving the remote instruction from the remote commander R, the autonomous driving control unit 41 starts to go straight.

The remote instruction request to the remote commander R when going straight through the intersection with the traffic signal may be performed only in a predetermined case. This remote instruction request may be performed only when it is difficult for the external environment recognition unit 32 to recognize the color of the traffic signal due to a backlight or fog, for example.

(Going Straight at Intersection without Traffic Signal)

As an example, as illustrated in FIG. 6A, a case will be described where the autonomous driving vehicle 2 goes straight through an intersection in a narrow road where the traffic signal is not installed.

(Step E1)

Similarly to step A1, the remote instruction determination unit 34 recognizes that the autonomous driving vehicle 2 reaches the intersection where vehicle goes straight (that is, the remote instruction required situation).

(Step E2)

Similarly to the step A2 described above, the autonomous driving ECU 20 stops the autonomous driving vehicle 2 at a predetermined stop position.

(Step E3)

The remote instruction determination unit 34 requests the remote instruction by the remote commander R.

(Step E4)

As described above, when the autonomous driving vehicle 2 goes straight through the intersection on the narrow road, as an example, when issuing the remote the remote instruction, the remote commander R needs to check the situation (the situations of the autonomous driving vehicle 2 at the right and left sides) of a road R2 intersecting the road R1 on which the autonomous driving vehicle 2 travels. Therefore, as an example, the transmission information limitation unit 35 selects a sensor that detects the right side and a sensor that detects the left side of the autonomous driving vehicle 2 from a plurality of sensors included in the external sensor 22, and sets the detection information detected by the selected sensor, as the detection information within the limited information range. That is, the transmission information limitation unit 35 can set the range of information to be transmitted to the remote commander R among the detection information detected by the external sensor 22 as the limited information range based on the map information and the trajectory.

Here, the transmission information limitation unit 35 may select any type of sensor from the sensors such as a camera, a radar, or a LIDAR exemplified as a sensor included in the external sensor 22. Then, the travel situation information transmission unit 39 transmits the travel situation information of the autonomous driving vehicle 2 including the detection information of which the information range is set as the limited information range, to the remote instruction server 10.

(Step E5)

The remote commander R checks the detection information within the limited information range included in the travel situation information received from the autonomous driving vehicle 2, and performs the instruction to the autonomous driving vehicle 2 to change the position and posture of the autonomous driving vehicle 2 if the desired information such as the necessary information is not included. In the example illustrated in FIG. 6A, since the detection area of the sensor that detects the right side and the detection area of the sensor that detects the left side are shielded by the walls W1 and W2, the remote commander R issues the remote instruction to change the position and posture of the autonomous driving vehicle 2. However, the remote commander R may issues the instruction to change the detection area of the external sensor 22.

If the notification of the fact that the necessary information is not included in the detection information within the limited information range is performed via the commander interface 3 of the remote instruction apparatus 1, the remote commander R may issue the instruction to change the position and posture of the autonomous driving vehicle 2 based on this notification. In addition, if the proposal to change the position and posture of the autonomous driving vehicle 2 is performed via the commander interface 3 of the remote instruction apparatus 1, the remote commander R may perform an instruction to change the position and posture of the autonomous driving vehicle 2 based on the proposal. If the notification and the proposal are not performed, the remote commander R may issues the instruction to change the position and posture of the autonomous driving vehicle 2 based on the result of checking the travel situation information.

(Step E6)

When the instruction to change the position and posture of autonomous driving vehicle 2 is issued by the remote commander R, the autonomous driving control unit 41 changes the position and posture of the autonomous driving vehicle 2 based on the instruction to change the position and posture. Here, for example, as illustrated in FIG. 6B, the remote commander R causes the autonomous driving vehicle 2 to go forward from the current position and to stop such that the detection area of the sensor that detects the right side and the detection area of the sensor that detects the left side are not shielded by the walls W1 and W2 (such that the shielded portion is reduced).

(Step E7)

The remote commander R checks the travel situation information transmitted from the autonomous driving vehicle 2 and issues the remote instruction.

(Step E8)

When receiving the remote instruction from the remote commander R, the autonomous driving control unit 41 starts to go straight.

(Entering Roundabout)

Figure 14:
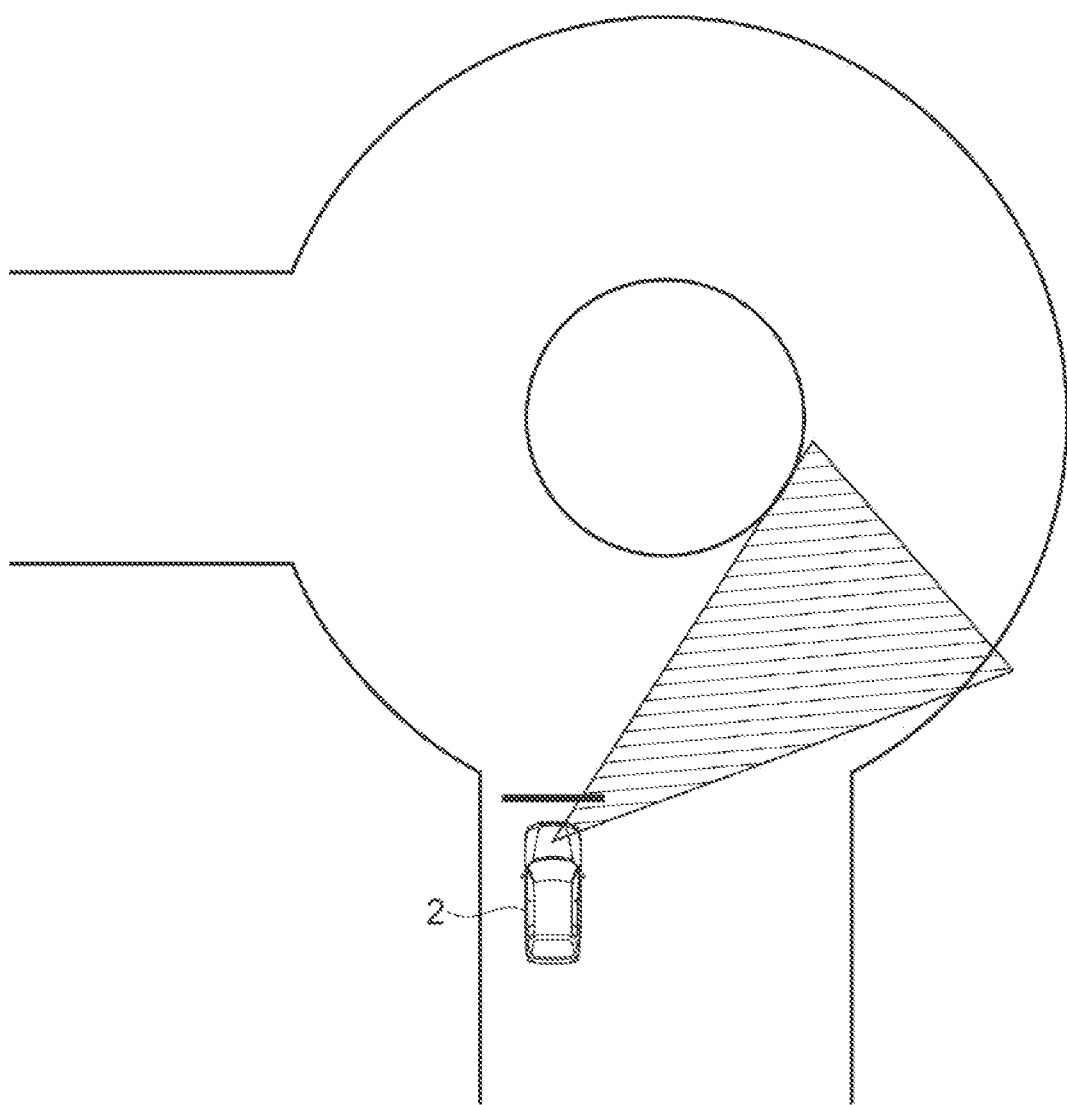
FIG. 14 is a schematic diagram illustrating setting of the limited information range when the autonomous driving vehicle enters a roundabout.

As an example, a case where the autonomous driving vehicle 2 enters the roundabout as illustrated in FIG. 14 will be described. Here, in the roundabout, the vehicle travels clockwise.

(Step F1)

Similarly to step A1, the remote instruction determination unit 34 recognizes that the autonomous driving vehicle 2 reaches the roundabout (remote instruction required situation).

(Step F2)

Similarly to the step A2 described above, the autonomous driving ECU 20 stops the autonomous driving vehicle 2 at a predetermined stop position.

(Step F3)

The remote instruction determination unit 34 requests the remote instruction by the remote commander R.

(Step F4)

When entering the roundabout, for example, when issuing the remote the remote instruction, the remote commander R needs to check another vehicle traveling in the roundabout. Therefore, as an example, the transmission information limitation unit 35 selects a sensor of which the detection area includes the right front of the autonomous driving vehicle 2 from the sensors included in the external sensor 22, and sets only the detection information detected by the selected sensor as the detection information within the limited information range. That is, the transmission information limitation unit 35 can set the range of information to be transmitted to the remote commander R among the detection information detected by the external sensor 22 as the limited information range based on the map information and the trajectory.

Here, the transmission information limitation unit 35 may select any type of sensor from the sensors such as a camera, a radar, or a LIDAR exemplified as a sensor included in the external sensor 22. Then, the travel situation information transmission unit 39 transmits the travel situation information of the autonomous driving vehicle 2 including the detection information of which the information range is set as the limited information range, to the remote instruction server 10.

(Step F5)

The remote commander R checks the travel situation information transmitted from the autonomous driving vehicle 2 and issues the remote instruction.

(Step F6)

When receiving the remote instruction from the remote commander R, the autonomous driving control unit 41 starts to enter the roundabout while turning left.

(Overtaking Stopped Vehicle)

As an example, as illustrated in FIG. 4A, a case of overtaking a stopped vehicle X1 (an obstacle) that stops on the traveling lane of the autonomous driving vehicle 2 will be described.

(Step G1)

The external environment recognition unit 32 recognizes the stopped vehicle X1 on the traveling lane of the autonomous driving vehicle 2. The remote instruction determination unit 34 recognizes that the autonomous driving vehicle 2 is in a situation of overtaking the stopped vehicle X1 (remote instruction required situation) based on the stopped vehicle X1 recognized by the external environment recognition unit 32 and the trajectory generated by the trajectory generation unit 40.

(Step G2)

The autonomous driving ECU 20 stops the autonomous driving vehicle 2 at a predetermined stop position. Here, for example, the autonomous driving ECU 20 stops the autonomous driving vehicle 2 at a position a predetermined distance before the stopped vehicle X1.

(Step G3)

The remote instruction determination unit 34 requests the remote instruction by the remote commander R.

(Step G4)

As described above, if the remote instruction apparatus 1 overtakes the stopped vehicle X1, as an example, when issuing the remote the remote instruction, the remote commander R needs to check that both a vehicle that comes straight on the oncoming lane (for a one-lane road on one side) and a vehicle that tries to overtake the autonomous driving vehicle 2 and the stopped vehicle from behind the autonomous driving vehicle 2 are not present. Therefore, as an example, the transmission information limitation unit 35 selects a sensor that detects the front side of the autonomous driving vehicle 2 and a sensor that detects the rear side of the vehicle 2 from the plurality of sensors included in the external sensor 22, and sets the only detection information detected by the selected sensor as the detection information within the limited information range. That is, the transmission information limitation unit 35 can set the range of information to be transmitted to the remote commander R among the detection information detected by the external sensor 22, as the limited information range, based on the external environment (recognized stopped vehicle X1) and the trajectory.

Here, the transmission information limitation unit 35 may select any type of sensor from the sensors such as a camera, a radar, or a LIDAR exemplified as a sensor included in the external sensor 22. Then, the travel situation information transmission unit 39 transmits the travel situation information of the autonomous driving vehicle 2 including the detection information of which the information range is set as the limited information range, to the remote instruction server 10.

Here, in step G4, the transmission information limitation unit 35 may further set a limited information range based on the result of recognition performed by the external environment recognition unit 32. Specifically, for example, the limited information range may be set based on the presence or absence of a following vehicle of the autonomous driving vehicle 2 (another vehicle behind the autonomous driving vehicle 2). Here, for example, if a following vehicle is present behind the autonomous driving vehicle 2, when the rear direction of the autonomous driving vehicle 2 is detected by the external sensor 22, an area that is shielded by the following vehicle is generated. As a result, the recognition accuracy of a rear-translation straight going vehicle (a vehicle traveling in the adjacent lane to the right side of the traveling lane of the autonomous driving vehicle 2) attempting to overtake the autonomous driving vehicle 2 from the rear through the right side of the autonomous driving vehicle 2, is decreased. In such a case, the autonomous driving vehicle 2 may travel based on the remote instruction from the remote commander R. However, if the following vehicle is not present at the rear side of the autonomous driving vehicle 2, the autonomous driving vehicle 2 can automatically check the rear-translation straight going vehicle by the autonomous driving and can overtake the stopped vehicle X1. Therefore, as an example, when the external environment recognition unit 32 does not recognize the following vehicle behind the autonomous driving vehicle 2, the transmission information limitation unit 35 detects the rear direction of the plurality of sensors of the external sensor 22 as a detection area. May not be included in the limited information range, and only the detection information of the sensor whose front is the detection area may be set as the detection information within the limited information range.

(Step G5)

The remote commander R checks the detection information within the limited information range included in the travel situation information received from the autonomous driving vehicle 2, and if the desired information such as necessary information is not included, then, performs at least one of the instruction to change the position and posture of the autonomous driving vehicle 2 and the instruction to change the detection area of the external sensor 22.

Here, as an example, when issuing the remote the remote instruction, the remote commander R needs to check the situation of the oncoming lane in the front direction of the autonomous driving vehicle 2 (the adjacent lane to the right of the traveling lane of the autonomous driving vehicle 2). For this reason, an oncoming lane is set in advance as the necessary information in such a situation. In the example illustrated in FIG. 4A, for example, the remote commander R has a large part of the detection area of the sensor that detects the front direction of the autonomous driving vehicle 2 shielded by the stopped vehicle X1, and it is difficult to confirm the oncoming lane. In this case, an instruction to change the position and posture of the autonomous driving vehicle 2 may be issued.

If a notification of a fact that the necessary information is not included in the detection information within the limited information range is performed via the commander interface 3 of the remote instruction apparatus 1, the remote commander R may issues the instruction to change the position and posture of the autonomous driving vehicle 2 based on this notification. In addition, if the change of the position and posture of the autonomous driving vehicle 2 or the change of the detection area of the external sensor 22 is proposed via the commander interface 3 of the remote instruction apparatus 1, the remote commander R may issues the instruction to change the position and posture of the autonomous driving vehicle 2 based on the proposal. If the notification and the proposal is not performed, the remote commander R may issues the instruction to change the position and posture of the autonomous driving vehicle 2 based on the result of checking the travel situation information.

(Step G6)

When the instruction to change the position and posture of autonomous driving vehicle 2 is issued by the remote commander R, the autonomous driving control unit 41 changes the position and posture of the autonomous driving vehicle 2 based on the instruction to change the position and posture. Here, as an example, as illustrated in FIG. 4B, the remote commander R causes the autonomous driving vehicle 2 to steer toward the right direction while progressing forward from the current position and to stop such that a vehicle coming straight on the oncoming lane can be detected without being shielded by the stopped vehicle X1.

When the instruction to change the detection area of the external sensor 22 is issued by the remote commander R, the sensor angle of view change unit 38 changes the detection area of the external sensor 22 based on the instruction to change the detection area. Here, for example, as illustrated in FIG. 4C, the remote commander R translates the position of the sensor of which the detection area is the front direction of the autonomous driving vehicle 2 to the position on the right side of the autonomous driving vehicle 2 such that the vehicle coming straight on the oncoming lane can be detected as much as possible without being shielded by the stopped vehicle X1. In this way, it becomes easy to detect the vehicle coming straight on the oncoming lane using the sensor that detects the front direction of the autonomous driving vehicle 2.

(Step G7)

The remote commander R checks the travel situation information transmitted from the autonomous driving vehicle 2 and issues the remote instruction.

(Step G8)

When receiving the remote instruction from the remote commander R, the autonomous driving control unit 41 starts to overtake the stopped vehicle X1.

(Lane Change to Avoid Construction Site)

As an example, as illustrated in FIG. 7, a case where a construction site K is present in a traveling lane of the autonomous driving vehicle 2 and a case of changing the lane to the oncoming lane to avoid the construction site K will be described.

(Step H1)

The external environment recognition unit 32 recognizes that the vehicle 2 reaches a start location of the construction site K (the remote instruction required situation) based on the position information on the autonomous driving vehicle 2, the map information in the map database 24, and the trajectory generated by the trajectory generation unit 40. Here, as an example, it is assumed that the map information includes the position information on the construction site K.

(Step H2)

The autonomous driving ECU 20 stops the autonomous driving vehicle 2 at a predetermined stop position. Here, for example, the autonomous driving ECU 20 stops the autonomous driving vehicle 2 at the position of the stop line provided in front of the construction site K.

(Step H3)

The remote instruction determination unit 34 requests the remote instruction by the remote commander R.

(Step H4)

When changing the lane to the oncoming lane to avoid the construction site K, as an example, when issuing the remote the remote instruction, the remote commander R needs to check the absence of a vehicle coming straight on the oncoming lane. Therefore, as an example, the transmission information limitation unit 35 selects the sensor that detects the front direction of the autonomous driving vehicle 2 from the plurality of sensors included in the external sensor 22, and sets only the detection information detected by the selected sensor, as detection information within the limited information range. That is, the transmission information limitation unit 35 sets the range of the information to be transmitted to the remote commander R among the detection information detected by the external sensor 22, as the limited information range, based on the map information (construction site K) and the trajectory.

Here, the transmission information limitation unit 35 may select any type of sensor from the sensors such as a camera, a radar, or a LIDAR exemplified as a sensor included in the external sensor 22. Then, the travel situation information transmission unit 39 transmits the travel situation information of the autonomous driving vehicle 2 including the detection information of which the information range is set as the limited information range, to the remote instruction server 10.

Here, if a traffic guide P is recognized by the external environment recognition unit 32, in step H4, the transmission information limitation unit 35 selects a sensor of which the detection area includes the traffic guide P from the plurality of sensors included in the external sensor 22. Here, the transmission information limitation unit 35 selects a camera as the sensor. Then, the transmission information limitation unit 35 may extract a portion including the traffic guide P from the image (detection information) captured by the selected camera, and may set the extracted image A1 as the detection information within the limited information range. That is, the transmission information limitation unit 35 can set the range of information to be transmitted to the remote commander R among the detection information detected by the external sensor 22 as the limited information range, based on the external environment (recognized traffic guide P) and the trajectory.

(Step H5)

The remote commander R checks the detection information within the limited information range included in the travel situation information received from the autonomous driving vehicle 2, and if the desired information such as necessary information is not included, then, performs at least one of the instruction to change the position and posture of the autonomous driving vehicle 2 and the instruction to change the detection area of the external sensor 22.

Here, as an example, when issuing the remote the remote instruction, the remote commander R needs to check the situation of the oncoming lane in the front direction of the autonomous driving vehicle 2 (the adjacent lane to the right of the traveling lane of the autonomous driving vehicle 2). For this reason, an oncoming lane is set in advance as the necessary information in such a situation. In the example illustrated in FIG. 7, for example, if the oncoming lane cannot be detected by the sensor that detects the front direction of the autonomous driving vehicle 2 (there are many undetectable portions), or the like, the remote commander R may issue the instruction to change the position and posture of the autonomous driving vehicle 2. The remote commander R may issue an instruction to change the position and posture of the autonomous driving vehicle 2 when the traffic guide P is not included or only partially included in the captured image of the camera.

If a notification of a fact that the necessary information is not included in the detection information within the limited information range is performed via the commander interface 3 of the remote instruction apparatus 1, the remote commander R may issues the instruction to change the position and posture of the autonomous driving vehicle 2 based on this notification. In addition, if the change of the position and posture of the autonomous driving vehicle 2 or the change of the detection area of the external sensor 22 is proposed via the commander interface 3 of the remote instruction apparatus 1, the remote commander R may issues the instruction to change the position and posture of the autonomous driving vehicle 2 based on the proposal. If the notification and the proposal is not performed, the remote commander R may issues the instruction to change the position and posture of the autonomous driving vehicle 2 based on the result of checking the travel situation information.

(Step H6)

When the instruction to change the position and posture of autonomous driving vehicle 2 is issued by the remote commander R, the autonomous driving control unit 41 changes the position and posture of the autonomous driving vehicle 2 based on the instruction to change the position and posture. When the instruction to change the detection area of the external sensor 22 is issued by the remote commander R, the sensor angle of view change unit 38 changes the detection area of the external sensor 22 based on the instruction to change the detection area.

(Step H7)

The remote commander R checks the travel situation information transmitted from the autonomous driving vehicle 2 and issues the remote instruction. If a captured image of the traffic guide P is transmitted from the autonomous driving vehicle 2, the remote commander R can check the guidance operation of the traffic guide P and issue the remote instruction.

(Step H8)

When receiving the remote instruction from the remote commander R, the autonomous driving control unit 41 starts the lane change to the oncoming lane to avoid the construction site K.

(Case where Falling Object is Present)

Figure 15:
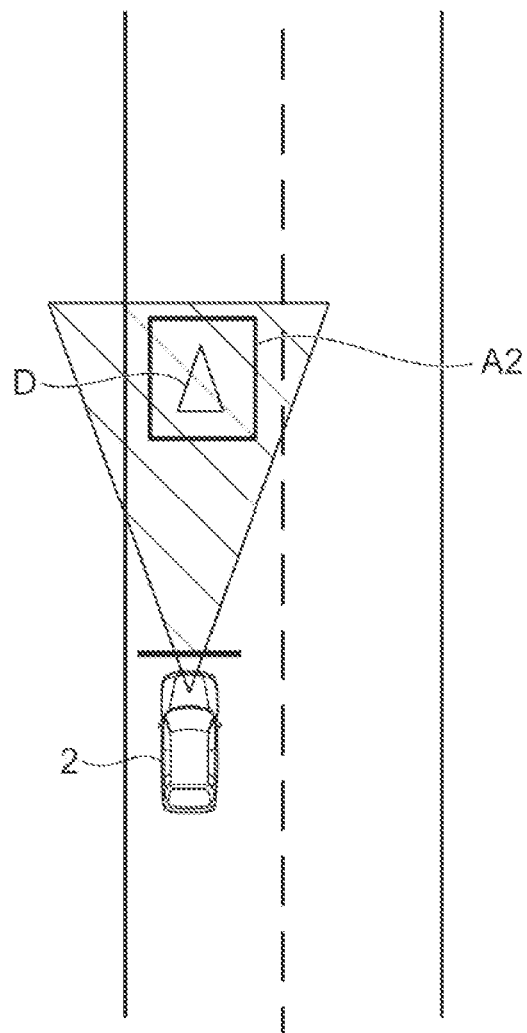
FIG. 15 is a schematic diagram illustrating setting of the limited information range when a falling object (obstacle) is present on the traveling lane in the front direction of the autonomous driving vehicle.

As an example, a case where a falling object D (an obstacle) is present on a traveling lane in the front direction of the autonomous driving vehicle 2 as illustrated in FIG. 15 will be described.

(Step J1)

The external environment recognition unit 32 recognizes the falling object D on the traveling lane of the autonomous driving vehicle 2. The remote instruction determination unit 34 recognizes that the autonomous driving vehicle 2 is in a situation of stepping over the falling object D or avoiding the falling object D by changing the lane (the remote instruction required situation) based on the falling object D recognized by the external environment recognition unit 32 and the trajectory generated by the trajectory generation unit 40.

(Step J2)

The autonomous driving ECU 20 stops the autonomous driving vehicle 2 at a predetermined stop position. Here, for example, the autonomous driving ECU 20 stops the autonomous driving vehicle 2 at a position a predetermined distance before the falling object D.

(Step J3)

The remote instruction determination unit 34 requests the remote instruction by the remote commander R.

(Step J4)

When the falling object D is present, for example, when issuing the remote the remote instruction, the remote commander R needs to check whether the autonomous driving vehicle 2 can step over the falling object D. Therefore, as an example, the transmission information limitation unit 35 selects the sensor that detects the front direction of the autonomous driving vehicle 2 from the plurality of sensors included in the external sensor 22, and sets only the detection information detected by the selected sensor, as detection information within the limited information range. That is, the transmission information limitation unit 35 can set the range of information to be transmitted to the remote commander R among the detection information detected by the external sensor 22, as the limited information range, based on the external environment (recognized falling object D) and the trajectory.

Here, since the falling object D is a stationary object, the transmission information limitation unit 35 may select a sensor such as a camera, or LIDAR, which are exemplified as an example of sensors included in the external sensor 22. Then, the travel situation information transmission unit 39 transmits the travel situation information of the autonomous driving vehicle 2 including the detection information of which the information range is set as the limited information range, to the remote instruction server 10.

The transmission information limitation unit 35 may extract a portion including a falling object D from the image captured by the selected camera, and may set the extracted image A2 as the detection information within the limited information range.

(Step J5)

The remote commander R checks the travel situation information transmitted from the autonomous driving vehicle 2 and issues the remote instruction. Here, for example, the remote commander R determines whether or not the autonomous driving vehicle 2 can step over the falling object D. Then, the remote commander R may issue, for example, the remote instruction to step over the falling object D or the remote instruction to change the lane to avoid the falling object D.

(Step J6)

When receiving the remote instruction from the remote commander R, the autonomous driving control unit 41 starts to step over the falling object D or starts to change the lane.

(Case of Passing Through Pedestrian Crossing)

Figure 16:
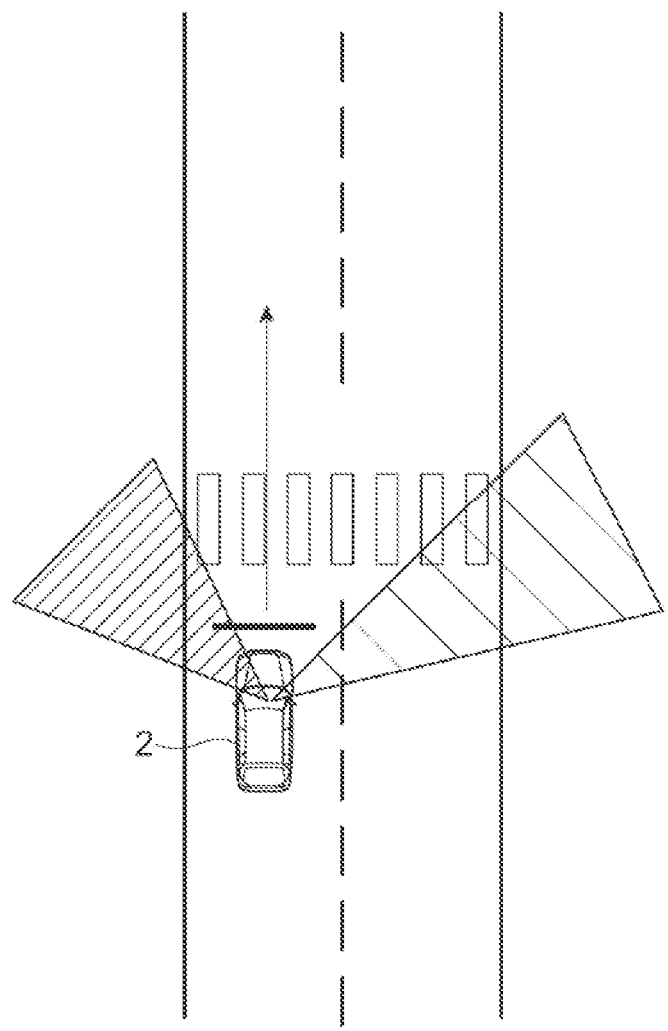
FIG. 16 is a schematic diagram illustrating setting of the limited information range when the autonomous driving vehicle passes through a pedestrian crossing.

As an example, a case where the autonomous driving vehicle 2 passes through a pedestrian crossing as illustrated in FIG. 16 will be described.

(Step K1)

Similarly to Step A1, the remote instruction determination unit 34 recognizes that the autonomous driving vehicle 2 reaches the pedestrian crossing (that is, the remote instruction required situation).

(Step K2)

Similarly to the step A2 described above, the autonomous driving ECU 20 stops the autonomous driving vehicle 2 at a predetermined stop position.

(Step K3)

The remote instruction determination unit 34 requests the remote instruction by the remote commander R.

(Step K4)

When passing the pedestrian crossing, for example, the remote commander R needs to check the absence of a pedestrian (such as a pedestrian or the like who is crossing the pedestrian crossing or the like) entering the pedestrian crossing from both sides of the road when issuing the remote the remote instruction. Therefore, as an example, the transmission information limitation unit 35 selects a sensor of which the detection area includes the right front direction of the autonomous driving vehicle 2 and a sensor of which the detection area includes the left front direction of the vehicle from the sensors included in the external sensor 22, and sets only the detection information detected by the selected sensor, as the detection information within the limited information range. That is, the transmission information limitation unit 35 can set the range of information to be transmitted to the remote commander R among the detection information detected by the external sensor 22 as the limited information range based on the map information and the trajectory.

Here, the transmission information limitation unit 35 may select any type of sensor from the sensors such as a camera, a radar, or a LIDAR exemplified as a sensor included in the external sensor 22. Then, the travel situation information transmission unit 39 transmits the travel situation information of the autonomous driving vehicle 2 including the detection information of which the information range is set as the limited information range, to the remote instruction server 10.

(Step K5)

The remote commander R checks the travel situation information transmitted from the autonomous driving vehicle 2 and issues the remote instruction.

(Step K6)

When receiving the remote instruction from the remote commander R, the autonomous driving control unit 41 cause the autonomous driving vehicle 2 to start and to pass through the pedestrian crossing.

Hereinafter, a specific example of setting the limited information range performed by the transmission information limitation unit 35 when a remote instruction required situation other than the remote instruction required situation described above occurs, will be described.

For example, a case where the autonomous driving vehicle 2 performs the lane change to the adjacent lane on the left will be described. In this case, the transmission information limitation unit 35 can select, for example, a sensor of which the detection area includes the front direction of the autonomous driving vehicle 2 and a sensor including the left rear direction of the vehicle from the sensors included in the external sensor 22 and can set only the detection information detected by the selected sensor as the detection information within the limited information range. For example, a case where the autonomous driving vehicle 2 performs the lane change to the adjacent lane on the right will be described. In this case, as an example, the transmission information limitation unit 35 can select a sensor of which the detection area includes the front direction of the autonomous driving vehicle 2 and a sensor of which the detection area includes the right rear direction of the vehicle from the sensors included in the external sensor 22 and can set only the detection information detected by the selected sensor as the detection information within the limited information range.

That is, when the autonomous driving vehicle 2 performs the lane change to the left or right side, the transmission information limitation unit 35 can set the range of information to be transmitted to the remote commander R among the detection information detected by the external sensor 22, as the limited information range, based on the map information and the trajectory. When the autonomous driving vehicle 2 performs the lane change to the left or right side, the transmission information limitation unit 35 may select any type of sensors such as a camera, radar, or LIDAR, which are exemplified as an example of sensors included in the external sensor 22.

For example, a case where the autonomous driving vehicle 2 enters a railroad crossing will be described. In this case, as an example, the transmission information limitation unit 35 can select a sensor of which the detection area includes the front direction of the autonomous driving vehicle 2 from the sensors included in the external sensor 22, and can set only the detection information detected by the selected sensor as the detection information within the limited information range. That is, the transmission information limitation unit 35 can set the range of information to be transmitted to the remote commander R among the detection information detected by the external sensor 22 as the limited information range based on the map information and the trajectory. The transmission information limitation unit 35 may select any type of sensors such as a camera, radar, or LIDAR, which are exemplified as an example of sensors included in the external sensor 22. In this case, for example, even if it is difficult for the external environment recognition unit 32 to recognize whether or not there is a space for the autonomous driving vehicle 2 to enter before crossing the railroad crossing, the traveling can be performed based on the remote operation by the remote commander R.

A case of starting after stopping at the pedestrian crossing where the traffic signal is not installed, will be described. In this case, as an example, the transmission information limitation unit 35 can select a sensor of which the detection area includes the front direction of the autonomous driving vehicle 2 from the sensors included in the external sensor 22, and can set only the detection information detected by the selected sensor as the detection information within the limited information range. That is, the transmission information limitation unit 35 can set the range of information to be transmitted to the remote commander R among the detection information detected by the external sensor 22 as the limited information range based on the map information and the trajectory. The transmission information limitation unit 35 may select any type of sensors such as a camera, radar, or LIDAR, which are exemplified as an example of sensors included in the external sensor 22. In this case, the remote commander R can check the absence of the pedestrian on the pedestrian crossing and can issue the remote instruction (instruction to start) based on the travel situation information transmitted from the autonomous driving vehicle 2.

For example, a case where the vehicle restarts after stopping before the lane orthogonal to the traveling lane of the autonomous driving vehicle 2, will be described. In this case, as an example, the transmission information limitation unit 35 can select a sensor of which the detection area includes the front side of the autonomous driving vehicle 2 from the sensors included in the external sensor 22, and can set only the detection information detected by the selected sensor as the information within the limited information range. That is, the transmission information limitation unit 35 can set the range of information to be transmitted to the remote commander R among the detection information detected by the external sensor 22 as the limited information range based on the map information and the trajectory. The transmission information limitation unit 35 may select any type of sensors such as a camera, radar, or LIDAR, which are exemplified as an example of sensors included in the external sensor 22. In this case, the remote commander R can check a moving obstacle in the lane orthogonal to the traveling lane of the autonomous driving vehicle 2 and can issue the remote instruction (instruction to start).

For example, a case where the vehicle passes through a tollgate on an expressway will be described. In this case, as an example, the transmission information limitation unit 35 can select a sensor of which the detection area includes the front direction of the autonomous driving vehicle 2 from the sensors included in the external sensor 22, and can set only the detection information detected by the selected sensor as the detection information within the limited information range. That is, the transmission information limitation unit 35 can set the range of information to be transmitted to the remote commander R among the detection information detected by the external sensor 22 as the limited information range based on the map information and the trajectory. In addition, the transmission information limitation unit 35 can select a camera included in the external sensor 22 such that the remote commander R can check the display of the Electronic Toll Collection (ETC) gate.

For example, a case where a lane is diverted on the expressway will be described. When the autonomous driving vehicle 2 is diverted to the left side, as an example, the transmission information limitation unit 35 selects a sensor of which the detection area includes the left front direction of the autonomous driving vehicle 2 and a sensor of which the detection area includes the rear direction of the vehicle from the sensors included in the external sensor 22. In addition when the autonomous driving vehicle 2 is diverted to the right side, for example, the transmission information limitation unit 35 selects a sensor of which the detection area includes the right front direction of the autonomous driving vehicle 2 and a sensor of which the detection area includes the rear direction of the vehicle from the sensors included in the external sensor 22. The transmission information limitation unit 35 can set only the detection information detected by the selected sensor as the detection information within the limited information range. That is, the transmission information limitation unit 35 can set the range of information to be transmitted to the remote commander R among the detection information detected by the external sensor 22 as the limited information range based on the map information and the trajectory. The transmission information limitation unit 35 may select any type of sensors such as a camera, radar, or LIDAR, which are exemplified as an example of sensors included in the external sensor 22.

For example, a case where the autonomous driving vehicle 2 merges into an adjacent lane on a express way will be described. If the autonomous driving vehicle 2 merges into the adjacent lane on the left side, for example, the transmission information limitation unit 35 selects a sensor of which the detection area includes the left front direction of the autonomous driving vehicle 2 and a sensor of which the detection area includes the left rear direction of the vehicle from the sensors included in the external sensor 22. In addition, if the autonomous driving vehicle 2 merges into the adjacent lane on the right side, as an example, the transmission information limitation unit 35 selects a sensor of which the detection area includes the right front direction of the autonomous driving vehicle 2 and a sensor of which the detection area includes the right rear direction of the vehicle from the sensors included in the external sensor 22. The transmission information limitation unit 35 can set only the detection information detected by the selected sensor as the detection information within the limited information range. That is, the transmission information limitation unit 35 can set the range of information to be transmitted to the remote commander R among the detection information detected by the external sensor 22 as the limited information range based on the map information and the trajectory. The transmission information limitation unit 35 may select any type of sensors such as a camera, radar, or LIDAR, which are exemplified as an example of sensors included in the external sensor 22.

For example, a case where there is a lane that merges with the traveling lane of the autonomous driving vehicle 2 on the expressway will be described. If there is a lane merging with the traveling lane of the autonomous driving vehicle 2 from the left side, for example, the transmission information limitation unit 35 selects a sensor of which the detection area includes the left front direction of the of the autonomous driving vehicle 2 and a sensor of which the detection area includes the left rear direction of the vehicle from the sensors included in the external sensor 22. In addition, if there is a lane merging with the traveling lane of the autonomous driving vehicle 2 from the right side, for example, the transmission information limitation unit 35 selects a sensor of which the detection area includes the right front direction of the of the autonomous driving vehicle 2 and a sensor of which the detection area includes the right rear direction of the vehicle from the sensors included in the external sensor 22. The transmission information limitation unit 35 can set only the detection information detected by the selected sensor as the detection information within the limited information range. That is, the transmission information limitation unit 35 can set the range of information to be transmitted to the remote commander R among the detection information detected by the external sensor 22 as the limited information range based on the map information and the trajectory. The transmission information limitation unit 35 may select any type of sensors such as a camera, radar, or LIDAR, which are exemplified as an example of sensors included in the external sensor 22.

Figure 17:
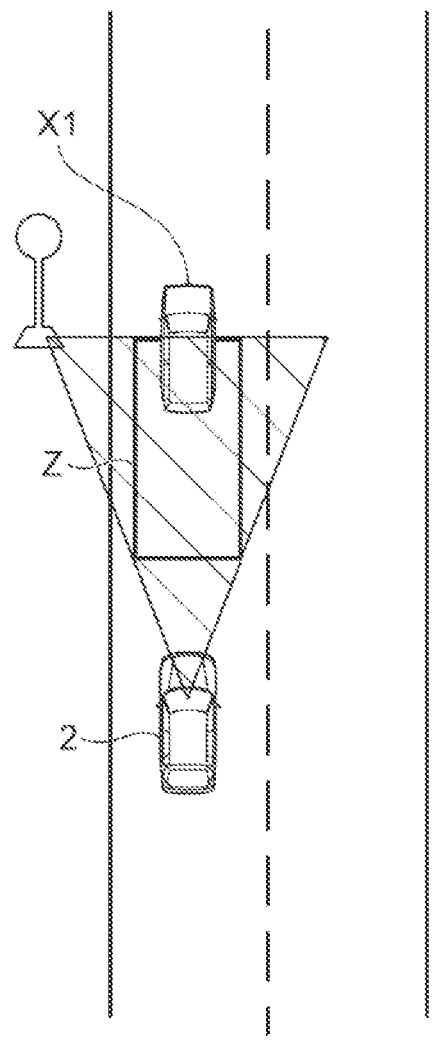
FIG. 17 is a schematic diagram illustrating t setting of the limited information range when the autonomous driving vehicle is stopped at a parking frame.

For example, a case of arriving at a destination and stopping at a stop frame provided on the road surface will be described. In addition, here, as illustrated in FIG. 17, a stopped vehicle X1 (obstacle) is present on the parking frame Z and it is a situation in which the autonomous driving vehicle 2 cannot autonomously stop in the parking frame Z. Therefore, the remote instruction request is performed (remote instruction required situation). The autonomous driving vehicle 2 stops before the parking frame Z and requests for the remote instruction. In this case, for example, the transmission information limitation unit 35 can select a sensor of which the detection area includes the front direction of the autonomous driving vehicle 2 from the sensors included in the external sensor 22 such that the parking frame Z is included in the detection area, and can set only the detection information detected by the selected sensor, as the detection information within the limited information range. That is, the transmission information limitation unit 35 can set the range of information to be transmitted to the remote commander R among the detection information detected by the external sensor 22 as the limited information range, based on the map information (a position of the parking frame Z (destination)) and the trajectory. The transmission information limitation unit 35 may select any type of sensors such as a camera, radar, or LIDAR, which are exemplified as an example of sensors included in the external sensor 22. In addition, the transmission information limitation unit 35 may select a camera from the sensors included in the external sensor 22 such that the parking frame Z attached to the road surface can be checked. Here, the remote commander R checks the travel situation information transmitted from the autonomous driving vehicle 2, and can issue the remote instruction to stop the autonomous driving vehicle 2 in the parking frame Z, or the remote instruction to get off the passengers at that place (regarded as the arrival), for example.

For example, a case where the vehicle arrives at the vicinity of a destination building and enters the building from a road will be described. In this case, as a method of setting the limited information range, the transmission information limitation unit 35 can adopt the method similar to that of a case of turning left or right at the intersection according to the direction of entering the building from the road.

Figure 18:
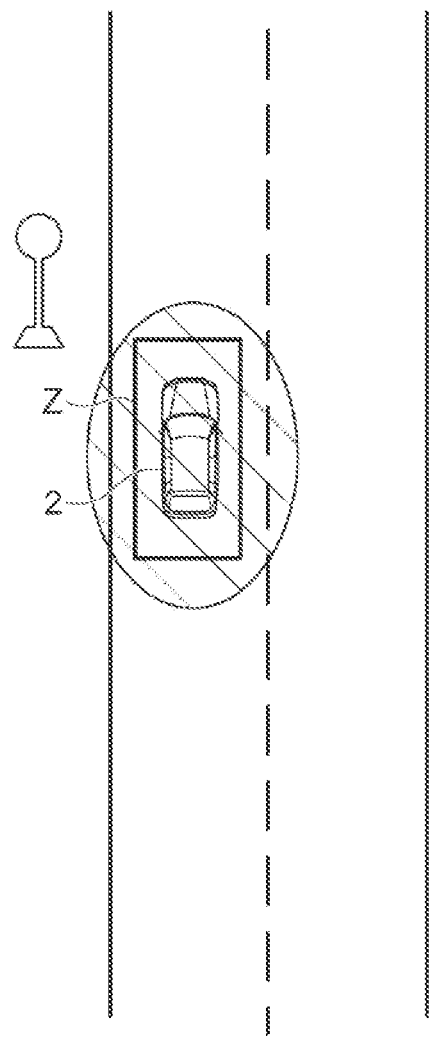
FIG. 18 is a schematic diagram illustrating setting of the limited information range when the autonomous driving vehicle is started.

For example, a case where the autonomous driving vehicle 2 starts after arriving at the destination and completing the getting on and off of the occupant will be descried. In addition, here, as illustrated in FIG. 18, it is assumed that the autonomous driving vehicle 2 is in a situation of starting from a stopped state in the parking frame Z (remote instruction required situation). For example, when the autonomous driving vehicle 2 starts, it is necessary to recognize the situation around the autonomous driving vehicle 2, but in some case, the accuracy of recognizing around the autonomous driving vehicle 2 may be low, and thus, it is difficult for the autonomous driving vehicle 2 to autonomously start. Therefore, the autonomous driving vehicle 2 may request a remote instruction when starting. In this case, as an example, the transmission information limitation unit 35 can select such a sensor that the detection information of the entire circumference of the autonomous driving vehicle 2 can be obtained, from the sensors included in the external sensor 22, and can set the detection information detected by the selected sensor as the detection information within the limited information range. Here, the transmission information limitation unit 35 may extract only the detection information in a range (within a predetermined range) close to the autonomous driving vehicle 2, and may set the extracted detection information as the detection information within the limited information range. The transmission information limitation unit 35 may select any type of a sensor, such as a camera, radar, LIDAR, and a sonar sensor, which are exemplified as an example of the sensors included in the external sensor 22. In addition, the transmission information limitation unit 35 may capture the images of the surroundings of the autonomous driving vehicle 2 with multiple cameras, and may select a camera system for displaying the entire circumference of the autonomous driving vehicle 2 in one image by joining the captured images.

For example, a case where a passenger arrives at a destination and gets on and off will be described. For example, when the occupant gets on and off the autonomous driving vehicle 2, it is necessary to recognize the situation in front of the door of the autonomous driving vehicle 2, but in some cases, the accuracy of recognizing in front of the door is low, and it may be difficult for the autonomous driving vehicle 2 to autonomously open and close the door to get on and off the occupant. Therefore, the autonomous driving vehicle 2 may request for the remote instruction in a case of the situation (remote instruction required situation) of getting on and off the occupant. In this case, for example, the transmission information limitation unit 35 can select such a sensor that the detection information in front of the door of the autonomous driving vehicle 2 can be obtained, from the sensors included in the external sensor 22, and can set the detection information detected by the selected sensor as the detection information within the limited information range. Here, the transmission information limitation unit 35 may extract only the detection information in a range (within a predetermined range) close to the autonomous driving vehicle 2, and may set the extracted detection information as the detection information within the limited information range. The transmission information limitation unit 35 may select any type of a sensor, such as a camera, radar, LIDAR, and a sonar sensor, which are exemplified as an example of the sensors included in the external sensor 22.

For example, a case where the autonomous driving vehicle 2 is moved backward from a stopped state will be described. For example, when the autonomous driving vehicle 2 is moved backward from a stopped state, it is necessary to recognize the situation of the rear direction of the autonomous driving vehicle 2, but in some cases, the accuracy of recognizing the near area in the rear direction of the autonomous driving vehicle 2 is low, and thus, it may be difficult for the autonomous driving vehicle 2 to autonomously move backward. Therefore, the autonomous driving vehicle 2 may request for the remote instruction in the case of the situation of moving backward (remote instruction required situation). In this case, as an example, the transmission information limitation unit 35 can select such a sensor that the detection information of the rear direction of the autonomous driving vehicle 2 can be obtained, from the sensors included in the external sensor 22, and can set the detection information detected by the selected sensor as the detection information within the limited information range. Here, the transmission information limitation unit 35 may extract only the detection information in a range (within a predetermined range) close to the autonomous driving vehicle 2, and may set the extracted detection information as the detection information within the limited information range. The transmission information limitation unit 35 may select any type of a sensor, such as a camera, radar, LIDAR, and a sonar sensor, which are exemplified as an example of the sensors included in the external sensor 22.

As described above, in the vehicle remote instruction system 100, the transmission information limitation unit 35 sets the range of information to be transmitted to the remote commander R as the limited information range, and thus, among the detection information detected by the external sensor 22, only the detection information according to the external situation and trajectory of the autonomous driving vehicle 2 (necessary detection information) can be transmitted to the remote commander R. In this way, the vehicle remote instruction system 100 can appropriately issue the remote instruction by the remote commander R, and it is possible to reduce the data capacity of the detection information transmitted to the remote commander R (remote instruction server 10) from the autonomous driving vehicle 2.

The transmission information limitation unit 35 can determine the sensor that transmits the detection information to the remote commander R among the plurality of sensors included in the external sensor 22 based on the external situation and the trajectory, and can set detection information detected by the determined sensor as the detection information within the limited information range. In this case, even if a plurality of sensors are included in the external sensor 22, the vehicle remote instruction system 100 determines a sensor that is to transmit the detection information according to the external situation, and sets the detection information detected by the determined sensor as the detection information within the limited information range. Therefore, it is possible to reduce the data capacity of the detection information transmitted to the remote commander R.

The transmission information limitation unit 35 can extract a portion to be transmitted to the remote commander R from the detection information detected by the external sensor 22 based on the external situation and the trajectory, and can set the detection information of the extracted portion as the detection information within the limited information range. In this case, from the detection information of the external sensor 22, the vehicle remote instruction system 100 extracts the portion to be transmitted, and sets the extracted portion as the detection information within the limited information range. Therefore, it is possible to reduce the data capacity of the detection information transmitted to the remote commander R.

In the vehicle remote instruction system 100, if the necessary information is not included in the detection information within the limited information range, the notification and proposal unit 37 can notify the remote commander R, or can propose to change the position and posture of the autonomous driving vehicle 2 or to change the detection area of the external sensor 22. In this case, the vehicle remote instruction system 100 can notify the remote commander R of a fact that the necessary information is not included in the limited information range, or can propose the remote commander R that the necessary information is not included in the limited information range, and thus, it is necessary to change the position and posture of the autonomous driving vehicle 2 or to change the detection area of the external sensor 22. In this way, the remote commander R can take a corresponding action based on the notification or the proposal from the vehicle remote instruction system 100.

The embodiments of the present disclosure are described above, but the present disclosure is not limited to the above embodiments. For example, the information presence or absence determination unit 36 does not necessarily need to determine the presence or absence of the necessary information within the limited information range, and the notification and proposal unit 37 does not necessarily need to perform the notification or the like.

The remote instruction apparatus 1 may be mounted on the vehicle. In this case, the remote commander R is also in the vehicle. The remote instruction server 10 may be a cloud server configured with ECUs of a plurality of vehicles.

What is claimed is:

1. A vehicle control device configured to recognize an external situation based on captured images from cameras including a front camera that captures an image in a front direction of a vehicle, a right camera that includes in an image capturing region, a region more toward a right direction than an image capturing region of the front camera, a left camera that includes in an image capturing region, a region more toward a left direction than the image capturing region of the front camera, and a rear camera that captures an image in a rear direction of the vehicle, and configured to control travel of the vehicle by a remote instruction relating to the travel of the vehicle provided from a remote commander, the vehicle control device comprising an electronic control unit configured to:

transmit to the remote commander the captured image of the front camera among the captured images captured by the cameras when an obstacle is present on a traveling route of the vehicle;
not transmit to the remote commander at least one of the captured images of the right camera, the left camera, and the rear camera; and
upon detection of the obstacle, select the image of the front camera to be transmitted as data to the remote commander and not select at least one of the images from the rear camera, the right camera, and the left camera.

2. The vehicle control device according to claim 1, wherein the vehicle is caused to start moving when the remote instruction to drive over the obstacle or the traveling route to avoid the obstacle is received from the remote commander.

3. The vehicle control device according to claim 1, wherein information provision relating to the travel of the vehicle or remote operation is requested from a remote controller while the vehicle is traveling.

4. The vehicle control device according to claim 1, wherein the electronic control unit is further configured to, upon not recognizing a following vehicle behind the vehicle, not transmit the image of the rear camera.

5. A vehicle control method performed by a vehicle control device configured to recognize an external situation based on captured images from cameras including a front camera that captures an image in a front direction of a vehicle, a right camera that includes in an image capturing region, a region more toward a right direction than an image capturing region of the front camera, a left camera that includes in an image capturing region, a region more toward a left direction than the image capturing region of the front camera, and a rear camera that captures an image in a rear direction of the vehicle, and configured to control travel of the vehicle by a remote instruction relating to the travel of the vehicle provided from a remote commander, the vehicle control method comprising:
transmitting to the remote commander the captured image of the front camera among the captured images captured by the cameras when an obstacle is present on a traveling route of the vehicle;
not transmitting to the remote commander at least one of the captured images of the right camera, the left camera, and the rear camera; and
upon detection of the obstacle, selecting the image of the front camera to be transmitted as data to the remote commander and not selecting at least one of the images from the rear camera, the right camera, and the left camera.

6. The vehicle control method according to claim 5, the vehicle is caused to start moving when the remote instruction to drive over the obstacle or the traveling route to avoid the obstacle is received from the remote commander.

7. The vehicle control method according to claim 5, comprising:
requesting information provision relating to the travel of the vehicle or remote operation from a remote controller while the vehicle is traveling.

8. A non-transitory computer-readable storage medium configured to store a vehicle control program operating an electronic control unit of a vehicle control device configured to recognize an external situation based on captured images from cameras including a front camera that captures an image in a front direction of a vehicle, a right camera that includes in an image capturing region, a region more toward a right direction than an image capturing region of the front camera, a left camera that includes in an image capturing region, a region more toward a left direction than the image capturing region of the front camera, and a rear camera that captures an image in a rear direction of the vehicle, and configured to control travel of the vehicle by a remote instruction relating to the travel of the vehicle provided from a remote commander,
wherein the vehicle control program operates the electronic control unit as an electronic control unit configured to:
transmit to the remote commander the captured image of the front camera among the captured images captured by the cameras when an obstacle is present on a traveling route of the vehicle;
not transmit to the remote commander at least one of the captured images of the right camera, the left camera, and the rear camera; and
upon detection of the obstacle, select the image of the front camera to be transmitted as data to the remote commander and not select at least one of the images from the rear camera, the right camera, and the left camera.

9. The storage medium according to claim 8, wherein the vehicle control program operates the electronic control unit so as to cause the vehicle to start moving when the remote instruction to drive over the obstacle or the traveling route to avoid the obstacle is received from the remote commander.

10. The storage medium according to claim 8, wherein the vehicle control program operates the electronic control unit so as to request information provision relating to the travel of the vehicle or remote operation from a remote controller while the vehicle is traveling.

\* \* \* \* \*